United States Patent
Caunter et al.

(10) Patent No.: US 9,747,141 B2
(45) Date of Patent: Aug. 29, 2017

(54) APPARATUS AND METHODS FOR WIDGET INTERCOMMUNICATION IN A WIRELESS COMMUNICATION ENVIRONMENT

(75) Inventors: Mark Leslie Caunter, Christchurch (GB); Bruce Kelly Jackson, Bournemouth (GB); Steven Richard Geach, Weymouth (GB)

(73) Assignee: QUALCOMM Incorporated, San Diego, CA (US)

( * ) Notice: Subject to any disclaimer, the term of this patent is extended or adjusted under 35 U.S.C. 154(b) by 601 days.

(21) Appl. No.: 12/407,593

(22) Filed: Mar. 19, 2009

(65) Prior Publication Data

US 2009/0249359 A1 Oct. 1, 2009

Related U.S. Application Data

(60) Provisional application No. 61/039,423, filed on Mar. 25, 2008, provisional application No. 61/039,408, filed on Mar. 25, 2008, provisional application No. 61/039,419, filed on Mar. 25, 2008.

(51) Int. Cl.
| | |
|---|---|
| *G06F 3/01* | (2006.01) |
| *G06F 9/46* | (2006.01) |
| *G06F 9/54* | (2006.01) |
| *G06F 9/44* | (2006.01) |
| *H04W 4/02* | (2009.01) |
| *H04W 4/20* | (2009.01) |
| *H04L 29/08* | (2006.01) |

(52) U.S. Cl.
CPC ............ *G06F 9/542* (2013.01); *G06F 9/4448* (2013.01); *H04L 67/18* (2013.01); *H04W 4/02* (2013.01); *H04W 4/20* (2013.01)

(58) Field of Classification Search
None
See application file for complete search history.

(56) References Cited

U.S. PATENT DOCUMENTS

| | | |
|---|---|---|
| 5,329,360 A | 7/1994 | Gillard et al. |
| 5,333,063 A | 7/1994 | Yoo |
| 5,375,068 A | 12/1994 | Palmer et al. |
| 5,386,568 A | 1/1995 | Wold et al. |
| 5,563,649 A | 10/1996 | Gould et al. |
| 5,617,467 A | 4/1997 | Bacher et al. |
| 5,894,473 A | 4/1999 | Dent |
| 5,936,616 A | 8/1999 | Torborg, Jr. et al. |

(Continued)

FOREIGN PATENT DOCUMENTS

| | | |
|---|---|---|
| CN | 1449219 A | 10/2003 |
| CN | 1758794 A | 4/2006 |

(Continued)

OTHER PUBLICATIONS

"Web widget", Wikipedia.org, http://en.wikipedi.org/wiki/Web_widget, Dec. 18, 2008.*

(Continued)

*Primary Examiner* — Umut Onat

(57) ABSTRACT

The described aspects relate to methods and apparatus for widget intercommunication in a wireless communication environment. In particular the described aspects relate to dynamically exchanging content between application graphical user interface widgets executed on a widget runtime model.

4 Claims, 17 Drawing Sheets

(56) References Cited

U.S. PATENT DOCUMENTS

| | | | |
|---|---|---|---|
| 6,049,330 A | 4/2000 | Redford | |
| 6,064,771 A | 5/2000 | Migdal et al. | |
| 6,125,283 A | 9/2000 | Kolev et al. | |
| 6,237,004 B1 | 5/2001 | Dodson et al. | |
| 6,324,651 B2 | 11/2001 | Kubik et al. | |
| 6,441,833 B1* | 8/2002 | Anderson et al. | 715/762 |
| 6,608,841 B1 | 8/2003 | Koodli | |
| 6,728,208 B1 | 4/2004 | Puuskari | |
| 6,925,609 B1 | 8/2005 | Lucke | |
| 6,996,393 B2 | 2/2006 | Pyhalammi | |
| 7,054,954 B2 | 5/2006 | Kalliokulju | |
| 7,200,390 B1 | 4/2007 | Henager et al. | |
| 7,227,900 B2 | 6/2007 | Porter et al. | |
| 7,304,585 B2 | 12/2007 | Suomela et al. | |
| 7,379,731 B2 | 5/2008 | Natsuno et al. | |
| 7,499,878 B2 | 3/2009 | Janakiraman et al. | |
| 7,523,331 B2 | 4/2009 | Van Der Heijden | |
| 7,587,486 B2 | 9/2009 | Taniguchi | |
| 7,596,389 B2 | 9/2009 | Tsuda et al. | |
| 7,660,871 B2 | 2/2010 | Koh et al. | |
| 7,672,690 B2 | 3/2010 | Hsu et al. | |
| 7,711,806 B1 | 5/2010 | Roka et al. | |
| 7,734,285 B2 | 6/2010 | Chmaytelli et al. | |
| 7,831,670 B2 | 11/2010 | Goodman et al. | |
| 7,873,908 B1 | 1/2011 | Varanasi et al. | |
| 7,886,229 B2 | 2/2011 | Pachet | |
| 7,890,572 B2 | 2/2011 | Goodman et al. | |
| 7,917,858 B2 | 3/2011 | Pereira et al. | |
| 7,948,817 B2 | 5/2011 | Coteus et al. | |
| 7,957,691 B1 | 6/2011 | Lee | |
| 7,983,711 B2 | 7/2011 | Juneja et al. | |
| 8,010,095 B2 | 8/2011 | Natsuno et al. | |
| 8,086,225 B2 | 12/2011 | Lee | |
| 8,131,271 B2 | 3/2012 | Ramer et al. | |
| 8,131,875 B1 | 3/2012 | Chen et al. | |
| 8,195,133 B2 | 6/2012 | Ramer et al. | |
| 2002/0107947 A1 | 8/2002 | Moragne et al. | |
| 2002/0152268 A1* | 10/2002 | Kureshy et al. | 709/203 |
| 2003/0061122 A1 | 3/2003 | Berkowitz et al. | |
| 2003/0065501 A1* | 4/2003 | Hamdan | G06F 9/465 704/1 |
| 2003/0120599 A1 | 6/2003 | Agboatwalla et al. | |
| 2003/0191859 A1 | 10/2003 | Ramsey | |
| 2004/0044999 A1 | 3/2004 | Gibson | |
| 2004/0098421 A1 | 5/2004 | Peng | |
| 2004/0119754 A1 | 6/2004 | Bangalore et al. | |
| 2004/0153992 A1 | 8/2004 | Molina-Moreno et al. | |
| 2004/0190853 A1 | 9/2004 | Dow et al. | |
| 2005/0039136 A1 | 2/2005 | Othmer | |
| 2005/0049989 A1 | 3/2005 | Kaminsky et al. | |
| 2005/0086105 A1 | 4/2005 | McFadden et al. | |
| 2005/0091576 A1 | 4/2005 | Relyea et al. | |
| 2005/0125787 A1 | 6/2005 | Tertitski et al. | |
| 2005/0278443 A1 | 12/2005 | Winner et al. | |
| 2006/0010394 A1 | 1/2006 | Chaudhri et al. | |
| 2006/0015818 A1 | 1/2006 | Chaudhri et al. | |
| 2006/0173838 A1 | 8/2006 | Garg et al. | |
| 2006/0224716 A1 | 10/2006 | Nakazawa et al. | |
| 2006/0235766 A1 | 10/2006 | Mifune et al. | |
| 2006/0242249 A1 | 10/2006 | Swanson et al. | |
| 2006/0242279 A1 | 10/2006 | Chen et al. | |
| 2006/0271618 A1 | 11/2006 | Kokubo et al. | |
| 2006/0277469 A1 | 12/2006 | Chaudhri et al. | |
| 2007/0038934 A1* | 2/2007 | Fellman | 715/700 |
| 2007/0078953 A1 | 4/2007 | Chai et al. | |
| 2007/0101291 A1 | 5/2007 | Forstall et al. | |
| 2007/0101297 A1 | 5/2007 | Forstall et al. | |
| 2007/0106627 A1* | 5/2007 | Srivastava et al. | 706/20 |
| 2007/0118813 A1 | 5/2007 | Forstall et al. | |
| 2007/0124688 A1 | 5/2007 | Nauerz et al. | |
| 2007/0124701 A1 | 5/2007 | Gong et al. | |
| 2007/0130541 A1* | 6/2007 | Louch et al. | 715/804 |
| 2007/0130589 A1 | 6/2007 | Davis et al. | |
| 2007/0192763 A1 | 8/2007 | Helvick | |
| 2007/0198698 A1 | 8/2007 | Boyd et al. | |
| 2007/0208616 A1* | 9/2007 | Choi | G06Q 30/02 705/14.13 |
| 2007/0244750 A1 | 10/2007 | Grannan et al. | |
| 2007/0245269 A1 | 10/2007 | Kim et al. | |
| 2007/0250643 A1* | 10/2007 | Pyhalammi et al. | 709/245 |
| 2007/0266093 A1 | 11/2007 | Forstall et al. | |
| 2007/0277109 A1 | 11/2007 | Chen et al. | |
| 2007/0283036 A1* | 12/2007 | Dey | H04L 43/106 709/233 |
| 2007/0300185 A1* | 12/2007 | Macbeth | G06F 9/4443 715/825 |
| 2007/0300265 A1 | 12/2007 | Karkkainen | |
| 2008/0010133 A1 | 1/2008 | Pyhalammi et al. | |
| 2008/0034309 A1 | 2/2008 | Louch et al. | |
| 2008/0034314 A1 | 2/2008 | Louch et al. | |
| 2008/0040681 A1 | 2/2008 | Synstelien et al. | |
| 2008/0052348 A1 | 2/2008 | Adler et al. | |
| 2008/0052372 A1* | 2/2008 | Weber et al. | 709/217 |
| 2008/0113656 A1 | 5/2008 | Lee et al. | |
| 2008/0126476 A1 | 5/2008 | Nicholas et al. | |
| 2008/0139189 A1 | 6/2008 | Hyatt | |
| 2008/0222658 A1 | 9/2008 | Allen et al. | |
| 2008/0235602 A1 | 9/2008 | Strauss et al. | |
| 2008/0242373 A1 | 10/2008 | Lu et al. | |
| 2008/0248815 A1 | 10/2008 | Busch | |
| 2008/0255962 A1 | 10/2008 | Chang et al. | |
| 2008/0307301 A1 | 12/2008 | Decker et al. | |
| 2009/0007186 A1 | 1/2009 | Hartwell | |
| 2009/0037509 A1 | 2/2009 | Parekh et al. | |
| 2009/0049097 A1 | 2/2009 | Nocifera et al. | |
| 2009/0070228 A1 | 3/2009 | Ronen | |
| 2009/0113346 A1* | 4/2009 | Wickramasuriya et al. | 715/825 |
| 2009/0138477 A1 | 5/2009 | Piira et al. | |
| 2009/0171939 A1 | 7/2009 | Athsani et al. | |
| 2009/0172567 A1 | 7/2009 | Brooks et al. | |
| 2009/0187939 A1* | 7/2009 | Lajoie | G06Q 30/02 725/34 |
| 2009/0235149 A1 | 9/2009 | Frohwein | |
| 2009/0248883 A1 | 10/2009 | Suryanarayana et al. | |
| 2009/0248996 A1 | 10/2009 | Mandyam et al. | |
| 2009/0249321 A1 | 10/2009 | Mandyam et al. | |
| 2009/0271778 A1 | 10/2009 | Mandyam et al. | |
| 2010/0185938 A1 | 7/2010 | Rising, III | |
| 2010/0305999 A1 | 12/2010 | Fujioka | |
| 2011/0055434 A1 | 3/2011 | Pyers et al. | |
| 2011/0099487 A1 | 4/2011 | Pyhalammi et al. | |
| 2012/0265613 A1 | 10/2012 | Ramer et al. | |
| 2012/0330750 A1 | 12/2012 | Ramer et al. | |
| 2013/0046852 A1 | 2/2013 | Saxena et al. | |
| 2013/0053005 A1 | 2/2013 | Ramer et al. | |

FOREIGN PATENT DOCUMENTS

| | | |
|---|---|---|
| CN | 1893418 A | 1/2007 |
| CN | 1963819 A | 5/2007 |
| CN | 101080095 A | 11/2007 |
| EP | 1217857 A2 | 6/2002 |
| EP | 1536327 A2 | 6/2005 |
| JP | 11075257 A | 3/1999 |
| JP | 2002373272 A | 12/2002 |
| JP | 2003016286 A | 1/2003 |
| JP | 2003283494 A | 10/2003 |
| JP | 2004500661 A | 1/2004 |
| JP | 2004326039 A | 11/2004 |
| JP | 2005011218 | 1/2005 |
| JP | 2005228228 A | 8/2005 |
| JP | 2006127382 A | 5/2006 |
| JP | 2006133871 A | 5/2006 |
| JP | 2006139443 A | 6/2006 |
| JP | 2006146600 A | 6/2006 |
| JP | 2006227855 A | 8/2006 |
| JP | 2006285936 A | 10/2006 |
| JP | 2007133871 A | 5/2007 |
| JP | 2008504610 A | 2/2008 |
| JP | 2010503052 A | 1/2010 |
| JP | 2010503127 A | 1/2010 |
| JP | 2010030525 A | 2/2010 |
| KR | 20060107950 A | 10/2006 |

(56) References Cited

FOREIGN PATENT DOCUMENTS

| | | |
|---|---|---|
| KR | 100861656 B1 | 10/2008 |
| KR | 20080109473 A | 12/2008 |
| RU | 2254611 C2 | 6/2005 |
| RU | 2371758 C2 | 10/2009 |
| WO | 9735296 A1 | 9/1997 |
| WO | WO-0167785 A2 | 9/2001 |
| WO | WO-02082265 A2 | 10/2002 |
| WO | 2006012343 A2 | 2/2006 |
| WO | WO2006037786 A2 | 4/2006 |
| WO | 2006089880 A1 | 8/2006 |
| WO | 2006135844 A2 | 12/2006 |
| WO | 2007073404 A1 | 6/2007 |
| WO | 2008010872 A1 | 1/2008 |
| WO | 2008030780 A1 | 3/2008 |
| WO | WO-2008030976 A2 | 3/2008 |

OTHER PUBLICATIONS

International Search Report and Written Opinion—PCT/US2009/037787, International Search Authority—European Patent Office—Oct. 20, 2009.

Inoue T., "RIA"—Three-Sided Offence and Deffence, I/O, Japan, vol. 33, No. 2, Kohgakusha Co., Ltd., Feb. 1, 2008, vol. 33, pp. 65-68.

Bott E., et al., "Microsoft Windows Vista Official Manual, First Volume," NIKKEI Business Publications, Inc., Sep. 3, 2007, 1st edition, pp. 104-106.

Live GPS Tracking: "FreeMacWare", Internet Archive, Oct. 5, 2007, 5 Pages, Retrieved from the internet < URL: https://web.archive.org/web/20071005201319/http://www.freemacware.com/live-gps-tracking/ >.

Mizuno T., "All about Google," Sotechsha Co., Ltd., Nov. 20, 2007, 1st edition, p. 322.

RSS Reader: "Dashboard Widget", Internet Archive, Aug. 22, 2007, 2 Pages, Retrieved from the internet < URL: https://web.archive.org/web/20070822225108/http://www.apple.com/jp/downloads/dashboard/news/rssreader.html>.

Suzaki S., et al., "Automatic Estimation Method of Use Interest Based on WWW Access Logs," Proceedings of Multimedia, Distributed, Cooperative and Mobile (DICOMO) Symposium, the Information Processing Society of Japan, Jul. 2, 1997, vol. 97, No. 2, pp. 251-256.

Widgets 1.0 Requirements: "W3C Working Draft 9", Feb. 2007, 21 Pages, Retrieved from the internet < URL: http://www.w3.org/TR/2007/WD-widgets-reqs-20070209/ >.

* cited by examiner

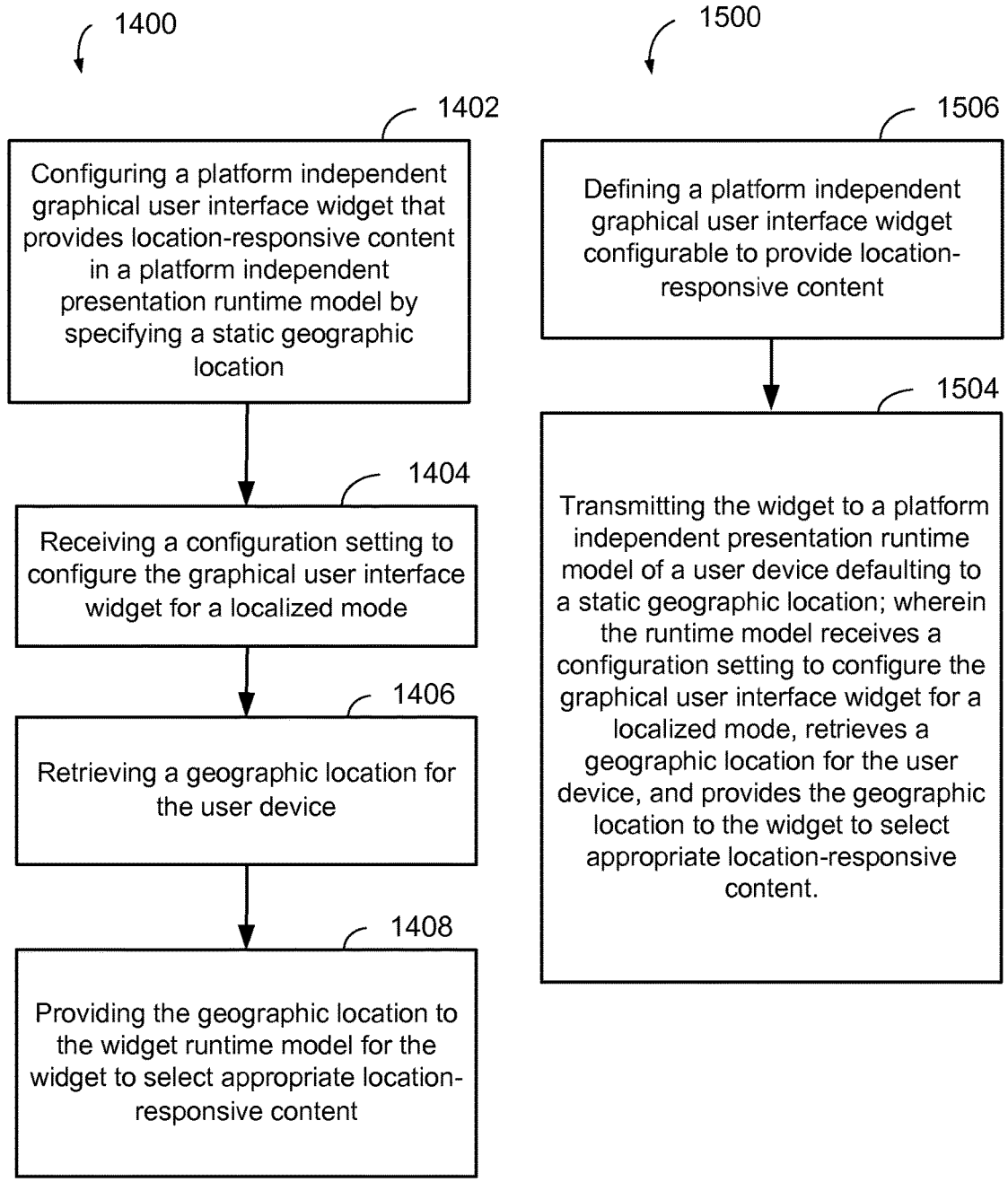
*Fig. 14*       *Fig. 15*

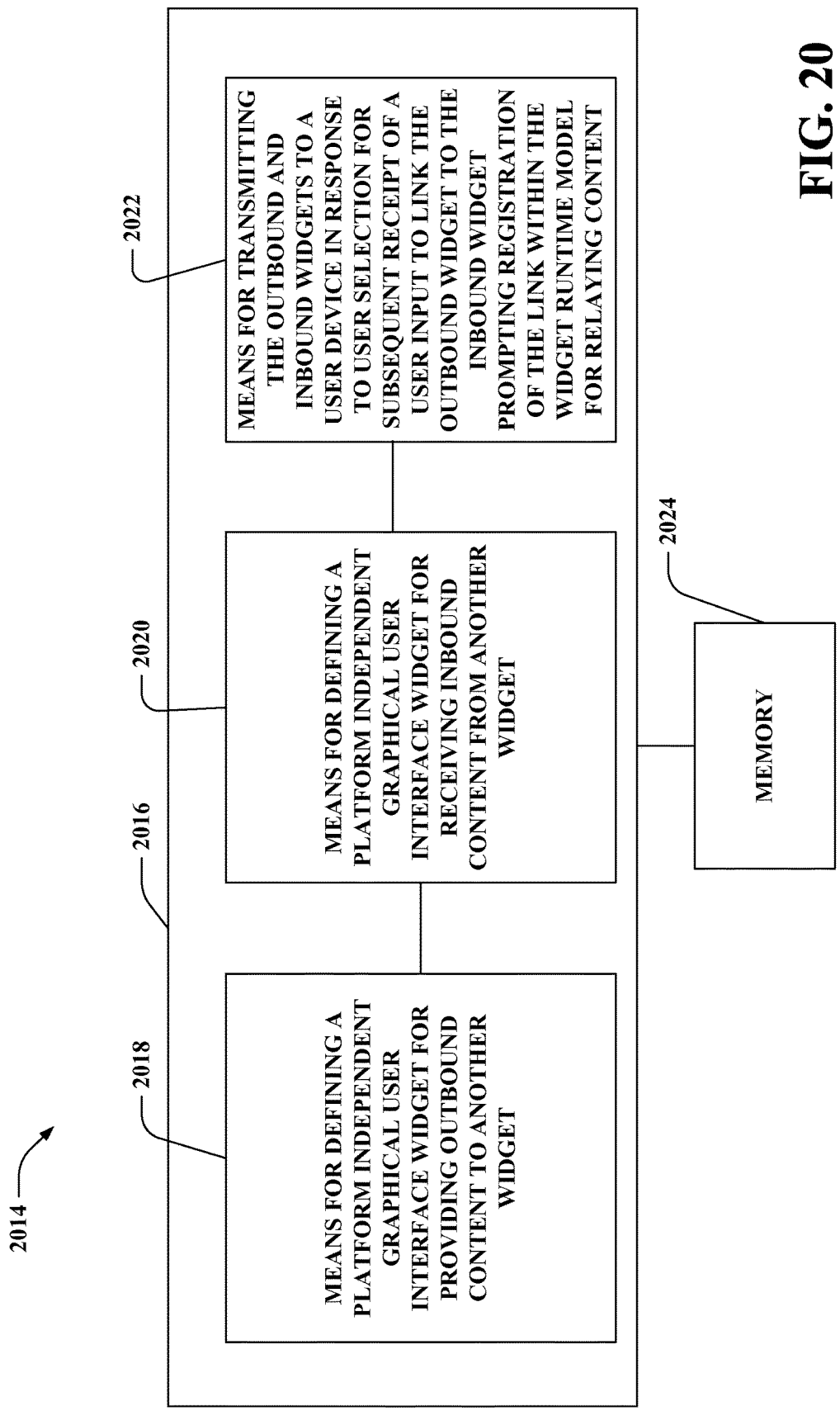

APPARATUS AND METHODS FOR WIDGET INTERCOMMUNICATION IN A WIRELESS COMMUNICATION ENVIRONMENT

CLAIM OF PRIORITY UNDER 35 U.S.C. §119

The present Application for Patent claims priority to the following Provisional Patent Applications:

Provisional Application No. 61/039,423 entitled "WIDGET INTERCOMMUNICATION IN A WIRELESS COMMUNICATION ENVIRONMENT" filed Mar. 25, 2008, and hereby expressly incorporated by reference herein;

Provisional Application No. 61/039,408 entitled "CUSTOMIZED SYNCHRONIZATION OF WIDGETS IN A WIRELESS COMMUNICATION ENVIRONMENT" filed Mar. 25, 2008, and hereby expressly incorporated by reference herein; and Provisional Application No. 61/039,419 entitled "WIDGET LOCALIZATION IN A WIRELESS COMMUNICATION ENVIRONMENT" filed Mar. 25, 2008, and hereby expressly incorporated by reference herein.

REFERENCE TO CO-PENDING APPLICATIONS FOR PATENT

The present Application for Patent is related to the following co-pending U.S. Patent Applications:

"APPARATUS AND METHODS FOR TRANSPORT OPTIMIZATION FOR WIDGET CONTENT DELIVERY" having 12/407,583, filed concurrently herewith, and expressly incorporated by reference herein;

"APPARATUS AND METHODS FOR WIDGET UPDATE SCHEDULING" having 12/407,574, filed concurrently herewith, and expressly incorporated by reference herein;

"APPARATUS AND METHODS FOR WIDGET-RELATED MEMORY MANAGEMENT" having 12/407,567, filed concurrently herewith, and expressly incorporated by reference herein; and "APPARATUS AND METHODS FOR MANAGING WIDGETS IN A WIRELESS COMMUNICATION ENVIRONMENT" having 12/407,559, filed concurrently herewith, and expressly incorporated by reference herein.

BACKGROUND

The described aspects relate to widgets, and more specifically to apparatus and methods relating to customizing widget operation on a user device for intercommunication.

Wireless networking systems have become a prevalent way to communicate with others worldwide. Wireless communication devices, such as a mobile or cellular telephone, a personal digital assistant (PDA), etc., operate on such networks, and have become smaller and more powerful in order to meet consumer needs and to improve portability and convenience. Consumers have become dependent upon these devices, demanding reliable service, expanded areas of coverage, additional services such as web browsing capabilities, and continued reduction in the size and cost of such devices.

Many of the functionalities and end user experiences of wireless communication devices have been developed, with limited success, to mimic the functionalities and end user experiences of a personal computing (PC) environment. For example, mobile web services have seen varying levels of success, even with the deployment of relatively high speed and high capacity services, such as advanced 3G services (1X-EV-DO Rev. A, UMTS HSPA). Much of the problem lies in the fact that the mobile web browsing experience is distinct from the PC experience with which most users are familiar. In particular, many end users find mobile web browsing applications to be hard to use, for example, with regard to entering search information, and difficult to enjoy, for example, as the resulting presentation of content is unpleasant.

It would desirable for a user to enjoy a common user experience, whether at a general purpose computing platform (e.g., desktop or laptop personal computer (PC)) or a more mobile communication device (e.g., personal digital assistant (PDA), smart phone, or hand-held PC). However, setting up a common experience is hampered by constraints presented by the respective user interfaces, as well as device usage. Moreover, standardization of the user experience should take into consideration how a user may want a customized experience based on creating more elaborate interactions between platform independent widgets to address additional desires and needs without having to be proficient in programming.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with a widget intercommunication approach that takes advantage of enhanced convenience and functionality by linking input and output widgets without having to be proficient in programming techniques.

In one aspect, a method is provided for dynamically exchanging content between application graphical user interface widgets executed on a widget runtime model of a computing platform on a user device. A platform independent graphical user interface widget defined to provide outbound content to another widget is selected. A platform independent graphical user interface widget defined to receive inbound content from another widget is selected. A user input to link the outbound widget to the inbound widget is received. The link within the widget runtime model for relaying content is registered.

In another aspect, at least one processor is provided for dynamically exchanging content between application graphical user interface widgets executed on a widget runtime model of a computing platform on a user device. A first module selects a platform independent graphical user interface widget defined to provide outbound content to another widget. A second module selects a platform independent graphical user interface widget defined to receive inbound content from another widget. A third module receives a user input to link the outbound widget to the inbound widget. A fourth module registers the link within the widget runtime model for relaying content.

In an additional aspect, a computer program product is provided for dynamically exchanging content between application graphical user interface widgets executed on a widget runtime model of a computing platform on a user device. A computer-readable medium comprises instructions for causing a computer to select a platform independent graphical user interface widget defined to provide outbound content to another widget, to select a platform independent graphical user interface widget defined to receive inbound content from another widget, to receive a user input to link the outbound widget to the inbound widget, and to register the link within the widget runtime model for relaying content.

In a further aspect, an apparatus is provided for dynamically exchanging content between application graphical user interface widgets executed on a widget runtime model of a computing platform on a user device. The apparatus includes means for selecting a platform independent graphical user interface widget defined to provide outbound content to another widget. The apparatus further includes means for selecting a platform independent graphical user interface widget defined to receive inbound content from another widget. Further included in the apparatus is means for receiving a user input to link the outbound widget to the inbound widget. The apparatus further includes means for registering the link within the widget runtime model for relaying content.

In another additional aspect, an apparatus is provided for dynamically exchanging content between application graphical user interface widgets executed on a widget runtime model of a computing platform on a user device. The apparatus includes a computer platform and a user interface. The user interface is for selecting a platform independent graphical user interface widget defined to provide outbound content to another widget, selecting a platform independent graphical user interface widget defined to receive inbound content from another widget, and receiving a user input to link the outbound widget to the inbound widget. A widget runtime model executed on a computing platform registers the link within the widget runtime model for relaying content.

In yet one other aspect, a method is provided for dynamically exchanging content between application graphical user interface widgets executed on a widget runtime model of a computing platform on a user device. A platform independent graphical user interface widget for providing outbound content to another widget is defined. A platform independent graphical user interface widget for receiving inbound content from another widget is defined. The outbound and inbound widgets to a user device is transmitted in response to user selection for subsequent receipt of a user input to link the outbound widget to the inbound widget prompting registration of the link within the widget runtime model for relaying content.

In yet another aspect, at least one processor is provided for dynamically exchanging content between application graphical user interface widgets executed on a widget runtime model of a computing platform on a user device. A first module defines a platform independent graphical user interface widget for providing outbound content to another widget. A second module defines a platform independent graphical user interface widget for receiving inbound content from another widget. A third module transmits the outbound and inbound widgets to a user device in response to user selection for subsequent receipt of a user input to link the outbound widget to the inbound widget prompting registration of the link within the widget runtime model for relaying content.

In yet an additional aspect, a computer program product is provided for dynamically exchanging content between application graphical user interface widgets executed on a widget runtime model of a computing platform on a user device. A computer-readable medium comprises instructions for causing a computer to define a platform independent graphical user interface widget for providing outbound content to another widget, to define a platform independent graphical user interface widget for receiving inbound content from another widget, and to transmit the outbound and inbound widgets to a user device in response to user selection for subsequent receipt of a user input to link the outbound widget to the inbound widget prompting registration of the link within the widget runtime model for relaying content.

In yet a further aspect, an apparatus is provided for dynamically exchanging content between application graphical user interface widgets executed on a widget runtime model of a computing platform on a user device. The apparatus includes means for defining a platform independent graphical user interface widget for providing outbound content to another widget. The apparatus further includes means for defining a platform independent graphical user interface widget for receiving inbound content from another widget. Further included in the apparatus are means for transmitting the outbound and inbound widgets to a user device in response to user selection for subsequent receipt of a user input to link the outbound widget to the inbound widget prompting registration of the link within the widget runtime model for relaying content.

In yet another additional aspect, an apparatus is provided for dynamically exchanging content between application graphical user interface widgets executed on a widget runtime model of a computing platform on a user device. A widget portal contains a plurality of platform independent graphical user interface widgets, comprising an outbound widget for providing outbound content to another widget and comprising an inbound widget for receiving inbound content from another widget. A network communication component transmits the outbound and inbound widgets to a widget runtime model of a user device in response to user selection for subsequent receipt of a user input to link the outbound widget to the inbound widget prompting registration of the link within the widget runtime model for relaying content.

In accordance with one or more aspects and corresponding disclosure thereof, various aspects are described in connection with a widget synchronization approach across a plurality of client devices of a user that customizes whether or not a widget is displayed or the amount of content that is displayed according to a distinction in usage of the particular client device. Thereby, the user is accorded the convenience of a generally common user experience when using different client devices. Yet, the heterogeneity of uses inherent or assigned to the different client devices is taken into consideration in customizing the user experience through widget presentation.

In another aspect, a method is provided for dynamically synchronizing the layout of a migratable application graphical user interface widget between a plurality of heterogeneous device platforms. Widget identification and a widget configuration is remotely recorded in a user account data structure in response to installation of a platform independent graphical user interface widget in a platform independent presentation runtime model of a first user device. An update to a second user device associated with the user account data structure is pushed in response to a determination that a second user device runtime model lacks a corresponding configured widget. The widget configuration includes a content customization dependent upon usage of a respective first and second user device for implementation.

In another additional aspect, an apparatus is provided for dynamically synchronizing the layout of a migratable application graphical user interface widget between a plurality of heterogeneous device platforms. Network storage records remotely a widget identification and a widget configuration in a user account data structure in response to installation of a platform independent graphical user interface widget in a platform independent presentation runtime model of a first user device. A synchronization component pushes an update to a second user device via the communication component associated with the user account data structure in response to a determination that the second user device runtime model lacks a corresponding configured widget. A communication component communicates remotely to the first and second user devices. The widget configuration includes a content customization dependent upon usage of a respective first and second user device for implementation.

In yet one other aspect, a method is provided for dynamically synchronizing the layout of a migratable application graphical user interface widget on a user device that is one of a plurality of heterogeneous device platforms. A platform independent graphical user interface widget is selected and configured in a platform independent presentation runtime model of a first user device. A widget identification and a widget configuration are communicated to a remote widget portal for storing in a user account data structure. An update is received that is pushed from the remote widget platform to a second user device associated with the user account data structure in response to a determination that a second user device runtime model lacks a corresponding configured widget. The widget configuration includes a content customization dependent upon usage of a respective first and second user device for implementation.

In yet another additional aspect, an apparatus is provided for dynamically synchronizing the layout of a migratable application graphical user interface widget on a user device that is one of a plurality of heterogeneous device platforms. Each of a first and second user devices comprise a computing platform, a platform independent presentation runtime model executed on the computing platform and a user interface for selecting and configuring a platform independent graphical user interface widget, and a communication component. The latter is for communicating a widget identification and a widget configuration to a remote widget portal for storing in a user account data structure and for receiving an update pushed from the remote widget platform associated with the user account data structure in response to a determination that a corresponding user device runtime model lacks a corresponding configured widget. The widget configuration includes a content customization dependent upon usage of the respective user device for implementation.

In accordance with one or more aspects and corresponding disclosure thereof, various aspects are described in connection with a widget localization approach that takes advantage of certain location-responsive widgets being directed to, or having particular benefits, for mobile and portable user devices.

In another aspect, a method is provided for dynamically localizing content of an application graphical user interface widget executed on a widget runtime model of a computing platform on a user device. A platform independent graphical user interface widget configured to provide location-responsive content in a platform independent presentation runtime model by specifying a static geographic location. A configuration setting is received to configure the graphical user interface widget for a localized mode. A geographic location is retrieved for the user device. The geographic location is provided to the widget runtime model for the widget to select appropriate location-responsive content.

In another additional aspect, an apparatus is provided for dynamically localizing content of an application graphical user interface widget executed on a widget runtime model of a computing platform on a user device. A computing platform executes a platform independent presentation runtime model. A user interface configures a platform independent graphical user interface widget that provides location-responsive content in a platform independent presentation runtime model by specifying a static geographic location. A communication component receives a configuration setting to configure the graphical user interface widget for a localized mode, for retrieving a geographic location for the user device, and for providing the geographic location to the widget runtime model for the widget to select appropriate location-responsive content.

In yet one other aspect, a method is provided for dynamically localizing content of an application graphical user interface widget executed on a widget runtime model of a computing platform on a user device. A platform independent graphical user interface widget is defined that is configurable to provide location-responsive content. The widget is transmitted to a platform independent presentation runtime model of a user device defaulting to a static geographic location. The runtime model receives a configuration setting to configure the graphical user interface widget for a localized mode, retrieves a geographic location for the user device, and provides the geographic location to the widget to select appropriate location-responsive content.

In yet another additional aspect, an apparatus is provided for dynamically localizing content of an application graphical user interface widget executed on a widget runtime model of a computing platform on a user device. A widget portal defines a platform independent graphical user interface widget configurable to provide location-responsive content. A network communication component transmits the widget to a platform independent presentation runtime model of a user device defaulting to a static geographic location. The runtime model receives a configuration setting to configure the graphical user interface widget for a localized mode, retrieves a geographic location for the user device, and provides the geographic location to the widget to select appropriate location-responsive content.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 14 illustrates an exemplary flow diagram of a method for dynamically localizing content of an application graphical user interface widget in accordance with an aspect;

FIG. 15 illustrates an exemplary flow diagram of a method for dynamically localizing content of an application graphical user interface widget in accordance with an aspect;

FIG. 20 is an illustration of an example system that facilitates dynamically exchanging content between application graphical user interface widgets executed on a widget runtime model of a computing platform in accordance with an aspect.

DETAILED DESCRIPTION

Figure 1:
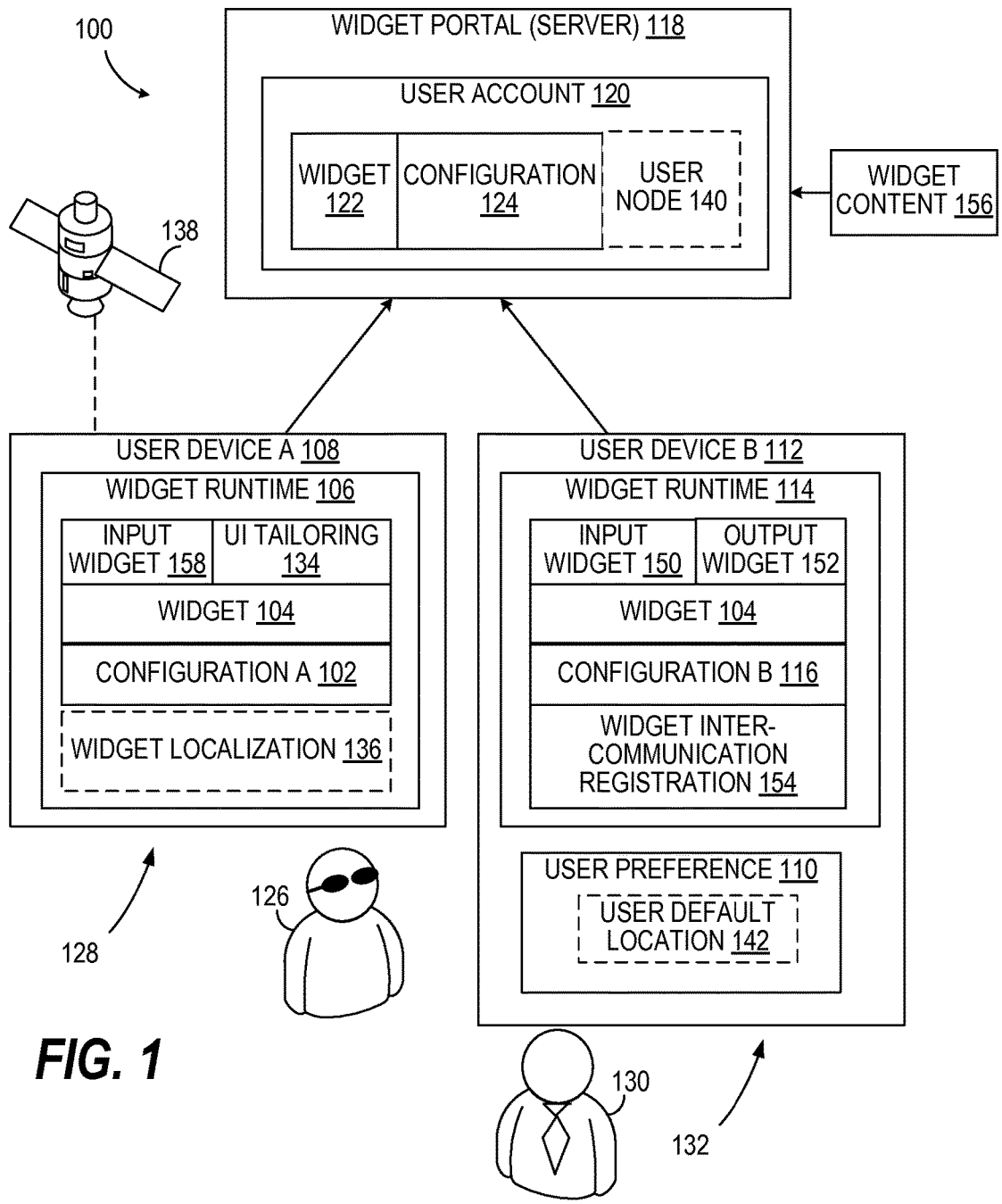
FIG. 1 illustrates block diagram of inter-device widget synchronization system that customizes automatic loading and configuration of a platform independent widget on client devices based upon usage or user interface constraints in accordance with an aspect.

In one aspect, a widget intercommunication system addresses how client devices can be used for different purposes (e.g., personal, work, travel, etc.) despite user interface constraints related to such uses (e.g., desktop personal computer (PC), laptop, notepad, personal digital assistant (PDA), smart phone, etc.). According to one or more aspects, user interface widgets can augment the functionality of such devices. In particular, enabling widgets to feed information to other widgets (intercommunication) can create many possibilities without the user having to know how to program an application. In one aspect, the user can benefit from synchronizing widgets between the various devices used, including the intercommunicating widgets, across different devices. Synchronization can be between different graphical resolutions for a rendering, and can reflect user preferences for the user's usage of a particular device as well as the constraints of the device pertaining to the manner of interacting with such widgets. In one example, by using a full graphical interface available on one client device (e.g., laptop, etc.), the user can configure more than one device, thus avoiding key input limitations on a mobile device making such configurations cumbersome. Automatic configurations by the widget runtime on a particular client device can also compensate for differences in the computing platform/user interface.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The described aspects relate to widgets, and more specifically to apparatus and methods relating to an end-to-end system for the creation, storage, delivery, and management of widgets and widget-related content in a wireless communication environment. The described aspects provide apparatus and methods that are operable to operate efficiently in a wireless network environment having constraints with regard to network connectivity, communications bandwidth or throughput, and wireless device memory and processing usage.

As such, the described aspects particularly relate to "mobile" widgets optimized for a wireless network environment. To understand mobile widgets, one should also understand their counterpart—desktop widgets. Desktop widgets are essentially compact, client applications that provide specific functionality to the end user via a specialized user interface. It should be understood, however, that mobile widgets are not a straightforward extension of desktop widgets, particularly in several respects: (a) Desktop widgets are simple to write, and leverage existing web programming technologies (particularly JavaScript and XML). In some aspects, mobile widgets may include compact protocols and utilize limited interpreters (e.g. JavaScript, etc.) due to limitations in device memory and processing power; (b) Desktop widgets function with an expectation of consistent connectivity, whereas such consistent connectivity is not necessarily feasible in the wireless network environment due to inconsistent available throughput, limited cellular capacity, and specific wireless data plans; (c) Functionality utilized by desktop widgets specified in standard JavaScript (e.g. ECMAScript versions, etc.) does not interface with wireless device-specific Application Programming Interfaces (API's) that can be extended to the mobile widget developer. Examples of such API's include the handset power meter, location information, and wireless connectivity status, etc.; (d) In some aspects, mobile widget accessibility may be provided in several forms, while desktop widgets are accessible directly on the PC desktop. In some aspects, mobile widgets are accessible via the wireless device application manager, while in other aspects mobile widgets may be accessible via a specific mobile widget management application or via a network portal; and (e) Mobile widget discovery and instantiation may be controlled by a wireless device application manager, by a mobile widget management application, or by a network portal. In contrast, desktop widget discovery and instantiation is not restricted to one client or one portal. Therefore, the described aspects take these considerations into account to provide a mobile widget service optimized for the wireless network environment.

In particular, the described mobile widgets provide an alternative to the mobile browser to access content on a wireless device, and also allow individual users to easily create custom mobile widgets for arbitrary wireless device or web resources.

Thus, the described aspects offer a true replacement to receiving content via a mobile browser, addressing the above-noted challenges by developing a system with the constraints of wireless access, wireless device capabilities, and web development in mind.

Turning to the drawings, in FIG. 1, a widget localization system 100 customizes configuration "A" 102 of a widget 104 executed by a widget runtime "A" 106 on a user device "A" 108. In one aspect, if widget 104 is a location-responsive widget, this customization may occur by user device "A" 108 thus becoming location responsive to enhance the utility and convenience of widget 104. In one aspect, this customization can reflect user preferences 110, which in the illustrative depiction have been made via another user device "B" 112. Thus, the widget 104 can be loaded for execution on a similar, but not necessarily identical widget runtime "B" 114, in accordance with a widget configuration "B" 116 that can be identical to the configuration 102 on the user device "A" 108.

This synchronization is facilitated by a widget portal (server) 118 which may maintain a user account 120. User account 120 may include, for example, identifying or storing the selected widget 122, configuration data 124, and user node tracking component 140, among other user account information. In one aspect, each device 108, 112 can be maintained with an identical widget configuration 124. Alternatively, an implicit or explicit different usage, depicted as a personal environment usage at 126 for a mobile communication device 128, can be determined based on the type of device 128 and/or the preferences 110. The widget 104 can thus operate with user interface (UI) customization, as compared to a different work environment usage, depicted at 130, or different UI constraints, depending on the type of device 132. As yet a further aspect, the user device "A" 108 can incorporate a UI tailoring component 134 that adjusts display or user control implementations peculiar to constraints of the device 108.

Part of the customization can entail the widget runtime 114 of the user device B 112 performing checks for two installed widgets, an input widget 150 capable of receiving inbound inter-widget communication and an output widget 152 capable of sending outbound inter-widget communication. A widget intercommunication registration component 154 determines that linkage is available and facilitates such communication. In addition, such communication can be deemed to be available across devices, so that the input widget 150 can receive widget content 156 from the widget portal 118, triggering an event that causes the widget runtime 114 of the user device B 112 to relay the event via the widget portal 118 to an input widget 158 executed by the widget runtime 106.

The configuring, preferences or tailoring can be inherently or explicitly responsive to location of a mobile or portable user device 108, 112. In the illustrative depiction, a mobile user device can include a widget localization component 136, such as an integral global positioning system (GPS) receiver that is responsive to GPS satellite signals, depicted at 138. For example, a particular widget 104 may require a current location or otherwise be hidden, as serving no purpose (current latitude and longitude depiction). As another example, a widget 104 can benefit from being explicitly configured to track a sensed location, but could otherwise revert to a network supplied location, such as from user node tracking component 140 of the widget portal (server) 118. Otherwise, localization can revert to, or be directed by the user to use, a default user location data 142 of the user preferences 110.

In another aspect, a user could simultaneously use two client devices 108, 112 that are both logged into the widget portal 118. For example, a user can have the active mobile communication device 128 while working on the laptop 132. The user node 140 of the widget portal 118 can infer, based upon a pattern of user behavior, such as using a rule-based or artificial intelligence component discussed below, or user preference that the two devices are synchronized for a location sensed for only one of the two devices 128, 132. For example, the location can be more accurately and readily determined based upon communication with integral capabilities of the mobile communication device 128. The two devices 128, 132 can also directly share location information, such as through a personal access network (PAN) ad hoc connection.

Figure 2:
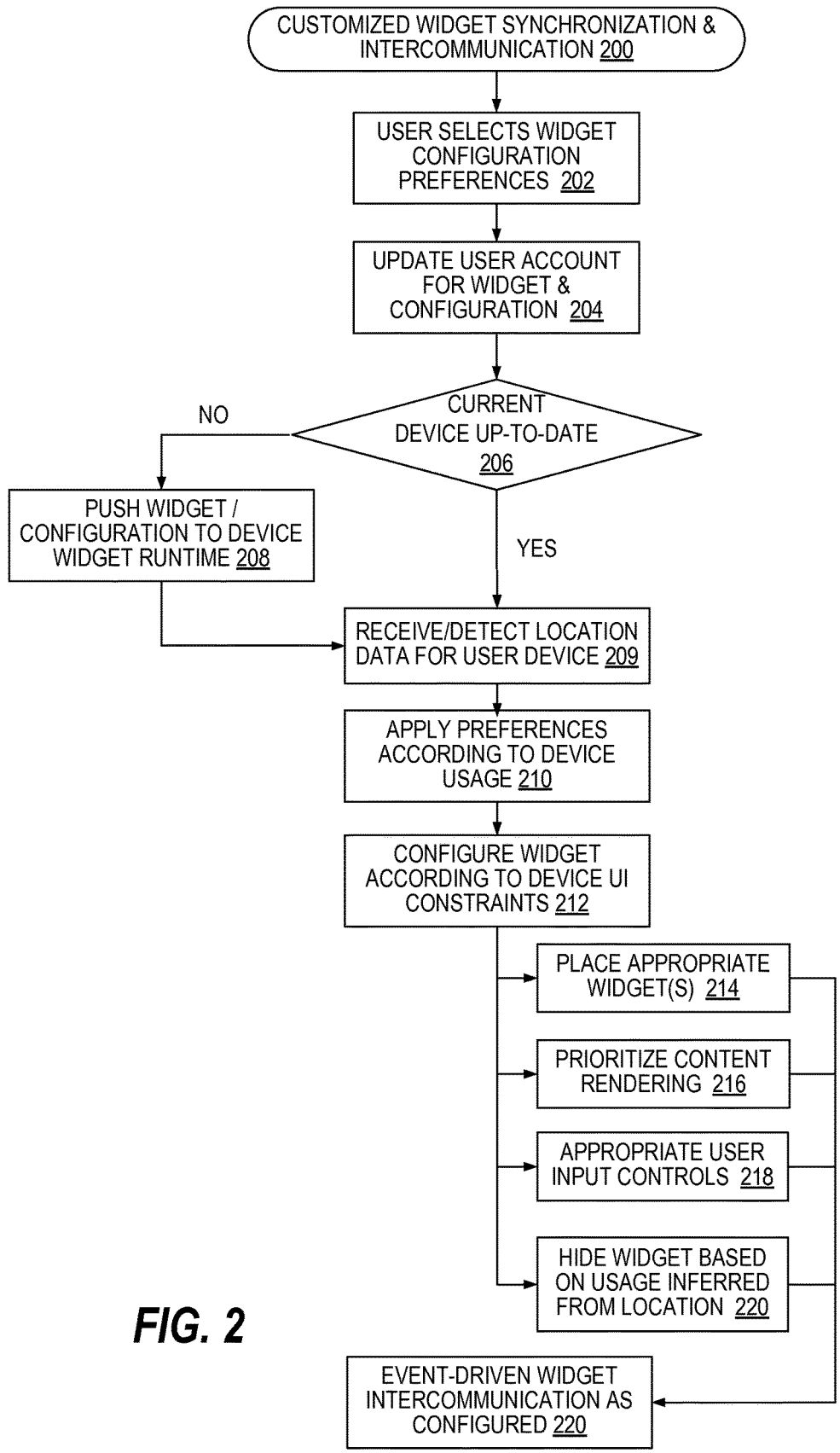
FIG. 2 illustrates a flow diagram for a methodology for customized widget synchronization in accordance with an aspect.

FIG. 2 illustrates methodologies and/or flow diagrams in accordance with the claimed subject matter, according to one aspect. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

A customized widget synchronization methodology 200 can include a user selecting widget configuration preferences at 202. In an aspect, this setting of preferences may include choosing to install a widget, selecting a widget from a catalog or list of available widgets, choosing whether to display the widget, the location on the interface to display the widget, and making initial setup changes, among other preferences. The server updates a user account for selected widgets and widget configuration at 204. Simultaneously or upon later usage of a device, a determination is then made as to whether the device is up to date for widgets and configuration at 206. If the device is not up to date with respect to widgets and configuration, a widget and widget configuration are pushed to the device widget runtime at 208. In one optional aspect, if the device is up to date, location data may be received or sensed at 209. The device can apply preferences according to device usage (e.g., personal, travel, work, etc.) at 210. The widget can be further customized in accordance with device UI constraints at 212, such as limiting what subsets of widgets are displayed or their orientation (e.g., tiled, scrolled, etc.) at 214. Customization can entail how a particular widget is displayed by prioritizing or reducing the amount of content/graphics displayed at 216. Customization can also map appropriate user controls to make interaction options available with the widget at 218. Optionally, this customization can include supporting event-driven widget intercommunication as configured at 220.

Location information can provide a source for a rule-based or artificial intelligence inference of usage of the client device that can automate selective presentation or hiding of a widget at 220, as discussed in more detail below. For example, tracking location of the client device approaching a pre-determined work facility followed by loss of a GPS location system can lead to inference that the client device is being used for work and that work-prohibited widgets should be hidden. Similarly, approaching a pre-determined residential address can be used to determine a home or personal use. As another example, a determination that the client device is being used while under frequent movement can be used for an inference of use during travel, in particular whether this travel mode is pedestrian, ground vehicle or aircraft, which can be used to select widgets appropriate for this mode of transportation.

The mode can also be used to alter presentation of location-responsive content, such as automatically switching to an audible mode when travelling such that a user is deemed not to be viewing the display when an urgent notice is received. Alternatively or in addition, the presentation of content can be made less obtrusive or obvious when a work mode is deemed, such as subtle reminder that an online auction is reaching a deadline that would only be perceptible to the user.

Figure 3:
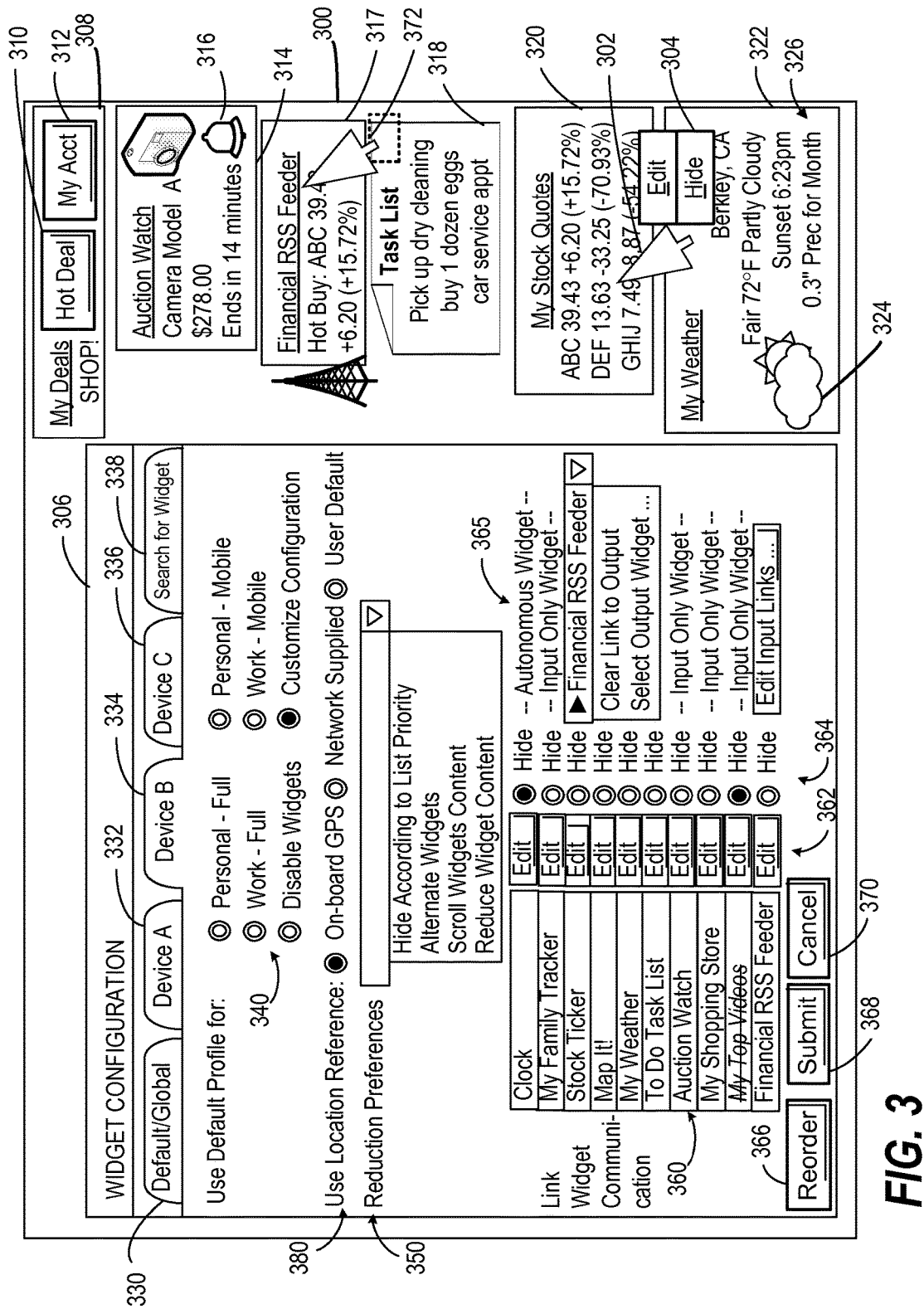
FIG. 3 illustrates a diagram of a graphical user interface for depicting widgets and a widget configuration window in accordance with an aspect.

In FIG. 3, an illustrative graphical user interface 300 is depicted with a high degree of available user interaction capabilities, such as a pointing device, depicted as a cursor 302, a keyboard, depicted for interacting with a popup menu 304. This high degree of available user interaction capabilities is also provided by a relatively large display allowing many widgets to be displayed along with a widget configuration window 306. For example, a shopping widget 308 may include selectable controls such as a hot deal button 310 and an account button 312. Hot deal button 310 may indicate to a user when a low price is advertised for product. In an aspect, a user may previously indicate particular products and price ranges when the user may wish to be notified. An auction watch widget 314 may include information for a particular product as well as an alarm active item 316. For example, auction watch widget 314 may include a product's name, model, price, time remaining in the auction, and the current bid for the product, among other information. A financial RSS feeder widget 317 can receive an internal widget input for displaying locally and for distributing to registered users. A task list widget 318 may have a customized list of items indicating a list of tasks to be performed. For example, the customized list may be displayed as a list of text items, pictures, or videos among other display options. A stock ticker widget 320 may display user selected stock symbols along with performance metrics for each stock symbol. A weather widget 322 includes a weather depiction image 324 as well as a number of text items 326 describing the current weather conditions. Text items 326 may include, for example, the city name, the current temperature, description of the current weather conditions, the sunset time, the precipitation for the month, and the forecast for the next day, among other text items.

Although some or all customizable widget configuration details can be implemented on a smaller display or via a more limited user input device, the widget configuration window 306 can set preferences for other user devices, as depicted by a default/global window tab 330, a device A window tab 332, a device B window tab 334, a device C window tab 336, and a widget search window tab 338. The selected device B is being customized by selecting a customizable configuration radio button 340. Other device configurations may include, for example, personal—full, personal—mobile, work—full, work—mobile, and disable widgets, among other configurations. A reduction preference pull-down menu 350 allows a user to select his preferred way to fit his selected widgets on a reduced resolution display. For example, the user may prefer to display the widgets by hiding widgets according to list priority, alternate widget display, scroll widget content, and reduce widget content, among other display preferences.

A selected widget list window 360 shows a list of widgets prioritized in an order, each with an edit button 362 and a hide radio button 364. For example, the widgets may be prioritized by frequency of use, or the time of day for displaying the widgets, among other methods of prioritization. The illustrative list, for example, includes a clock (hidden), a Family Tracker, Stock Ticker, Map It, My Weather, To Do Task List, Auction Watch, My Shopping Store, My Top Videos (indicated as having been hidden), and a financial RSS Feeder. In an aspect, a current location radio button 365 for each widget in the widget list window 360 may specify whether the widget can be localized or be in a standard mode. The radio button may be grayed out for those widgets not capable of localized content. In another aspect, each widget further has an indication or selectable control pertaining to whether or not the widget can be linked to another widget for intercommunication, as depicted at 365. For example, a widget may be an autonomous widget, e.g., the widget may have both input and output capabilities, be an input only widget, or be an output only widget. In addition, a widget may already have a link to another widget or may have the option of linking to another widget. In an aspect, a user may edit the input links to a widget. Other controls include a reorder button 366, a submit button 368 and a cancel button 370. Alternatively or in addition to using the configuration window 306, the user can drag and drop with the cursor, as depicted at 372, to link the stock widget 320 with the financial RSS feeder widget 317.

In an aspect, a location reference can be selected as depicted at 380 comprising an onboard-GPS, a network supplied location for the user device, or a user default (standard mode). Those items not applicable can be grayed out. Alternatively, an automatic or user-supplied hierarchy can be imposed for a desired source of location information that adapts to changing availability.

Figure 4:
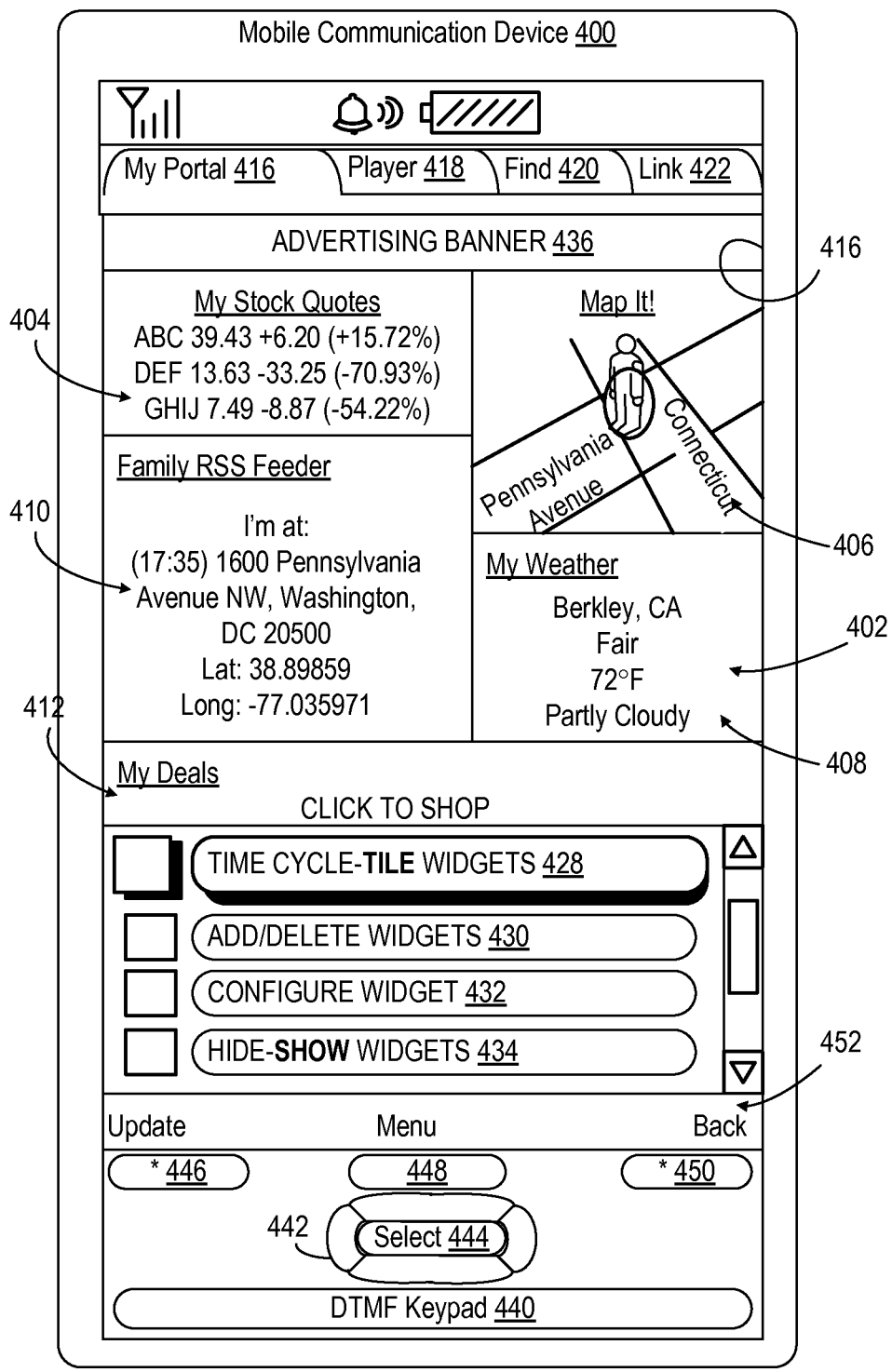
FIG. 4 illustrates a diagram of a mobile communication device displaying a plurality of widgets in a customized synchronization in accordance with an aspect.

In FIG. 4, a mobile communication device 400 provides a partially constrained graphical user interface (GUI) 402 that may be customized by applying some of these preferences and constraints by the subset of widgets that are displayed in tile format, the amount of content displayed for each widget, or the action options presented. In the illustrative depiction, a stock widget 404, a map widget 406, a weather widget 408, a family RSS feeder widget 410, and a shopping widget 412 are displayed. The GUI 402 also presents an advertising banner 436 and selectable tabs "My portal" 416, which is selected, as well as a media player tab 418, a find tab 420, and a link tab 422.

The various widgets displayed on mobile communication device 400 may be customized to adjust for limited display space, available channel throughput, UI limitations, space consideration, or controls available on the device, among others. For example, the map widget 406 can be customized by using GPS or cell identification information from the wireless device to determine the current location of the wireless device. The weather widget 408 may be customized by omitting a graphic and a portion of the text (e.g., sunset time, precipitation amount). The shopping widget 412 may be customized by deleting clickable buttons that may not be available given channel throughput, UI limitations, or space considerations.

The GUI 402 also presents a number of menu control items for customizing the widgets for this particular device 400, or perhaps for other devices as well. For example, a time cycle—tile widget menu item 428 can alter the preferred orientation from what can fit in a tiled orientation as depicted or alternating/scrolling through all selected widgets. An add/delete widget menu item 430 allows for changes to the selections. For example, a user may add widgets to the display or delete widgets from the display. A configure widget 432 enables customization, such as changing my weather to another city or to automatically link to a device location sensing capability, or adding or removing features from a widget. For example, the stock widget 404 may be customized to report other stocks. In an aspect, a widget may be hidden until triggered by an event, such as the auction watch widget 314 (FIG. 3) approaches a deadline for bidding. A hide/show widget toggle menu item 434 allows for a configured widget to remain selected but hidden to allow other widgets to be active.

Other controls may be provided. For example, for a GUI 402 that does not have a touch screen, dial tone multifunction keys 440 can be provided, as well as cursor keys 442 with a select button 444. Additional controls may include left, middle, and right menu buttons 446, 448, 450 to activate soft menu items displayed as "Update," "Menu" and "Back" depicted at 452.

The map it widget 406 is advantageously feeding a periodically updated present location for the mobile communication device 400 to the family RSS feeder widget 410, displaying a current address and latitude/longitude, for example, which can be relayed to individuals such as parents, relatives, or friends, among others connected to the user of the device 400 or consumed by the user to maintain awareness of their location.

Figure 5:
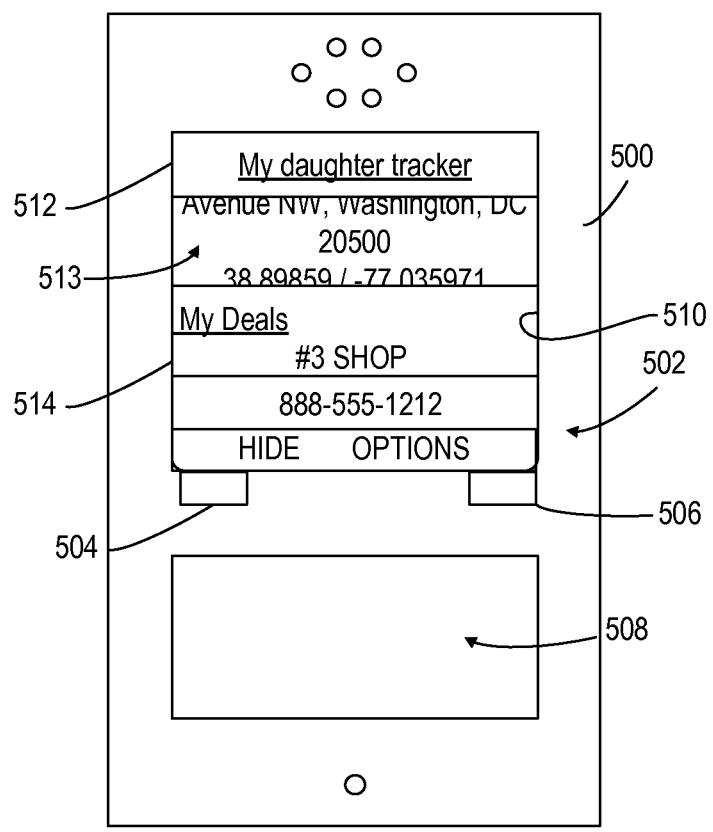
FIG. 5 illustrates a diagram of a limited user interface mobile communication device displaying a widget constrained by a customized synchronization in accordance with an aspect.

In FIG. 5, another user device depicted as mobile communication device 500 has a further constrained GUI 502 with user inputs of left and right menu buttons 504, 506 and Dual Tone Multiple Frequency (DTMF) buttons 508. The customization of widgets and their configuration may be further constrained by user preferences, as discussed above for example in FIG. 3, and device constraints. For example, the user may prefer to display my daughter tracker widget 512 scrolling through location reports from the mobile communication device 400 of FIG. 4 since only two lines are available and not three on GUI 502. Thus, the user of mobile communication device 500 may track the location of mobile communication device 400. In addition, a rendering of a shopping widget 514 provides a different indication for how a user can interact with the widget 514 (i.e., "#3 shop"). The user may use menu buttons 504 and/or 506 to modify the widgets displayed. In an aspect, the user may use widget configuration 306 (FIG. 3) to set the preferences for the widgets displayed on GUI 502.

Figure 6:
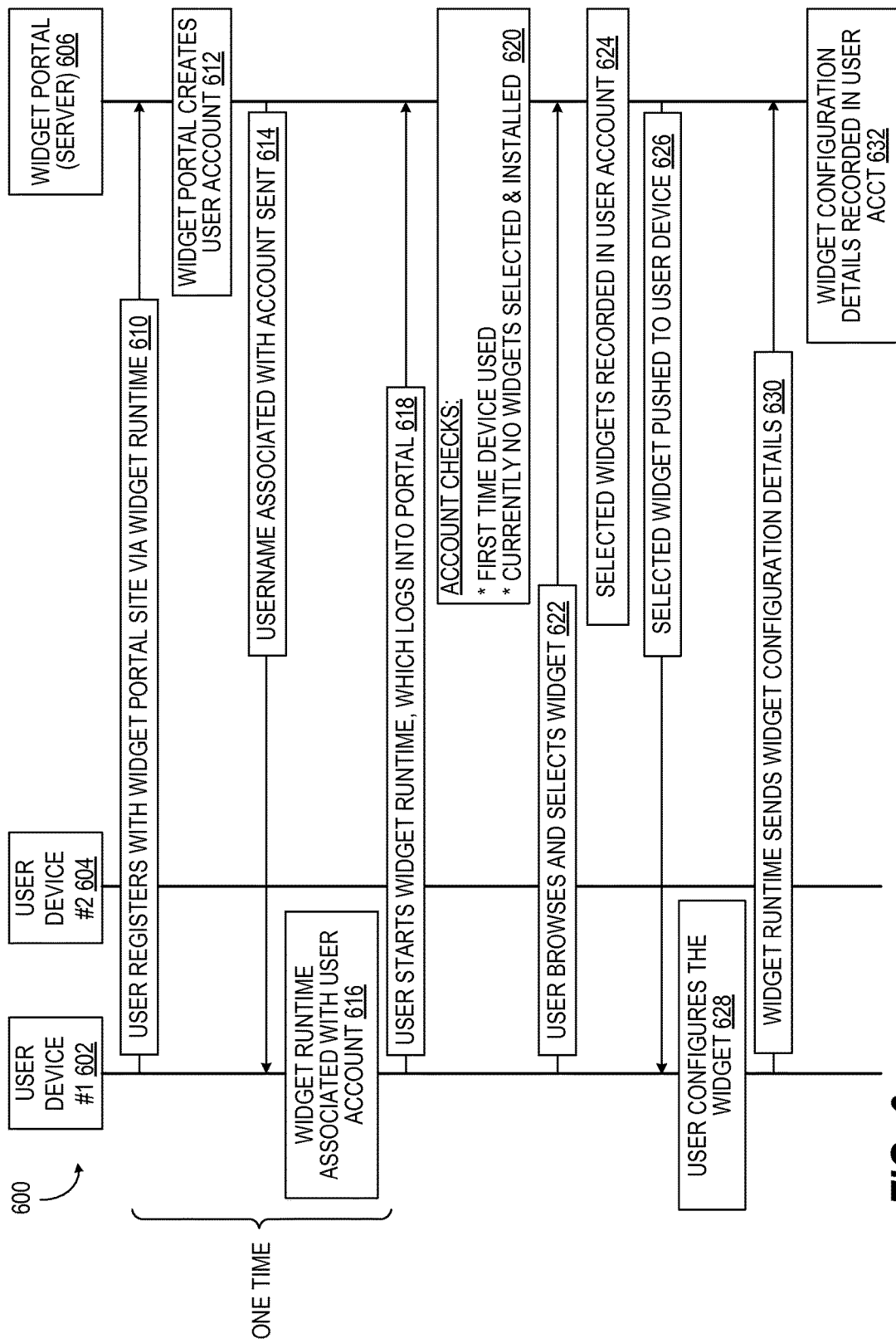
FIGS. 6-8 illustrate an exemplary timing diagram of two user devices synchronizing and configuring widgets across a widget portal in accordance with an aspect.

In FIG. 6, a methodology 600 is provided for synchronizing widgets in a customized fashion between a user device #1 602 and a user device #2 604 via widget portal (server) 606. As depicted at 610, a user registers with a widget portal (server) 600 via a widget runtime of the user device #1 602. The widget portal creates a user account as depicted at 612. The user account may include, for example, a username, a user node tracking component, whether this is a first time login, whether a widget has been previously installed on the user device, or whether a user input widget configuration change has been received, among other user account information. The widget portal (server) 606 confirms a username associated with the user account, sent to the user device #1 602 as depicted at 614. In response as depicted at 616, the widget runtime of user device #1 602 is associated with the user account. On subsequent occasions, the user starts widget runtime, which logs into the portal 606 as depicted at 618. In response as depicted at 620, the portal 606 performs account checks against what is reported as loaded on user device #1 602 as compared to what is recorded in the user account. In this initial login, no widgets have been selected. As depicted at 622, the user browses for and selects a widget via the widget portal 606. For example, the available widgets may be displayed in a list, in a menu, or a widget catalog, among other display options. The selected widget(s) are recorded in the user account by the widget portal 606 as depicted at 624 and the selected widget(s) are pushed to the user device #1 as depicted at 626. As depicted at 628, the user configures the widget(s), as discussed above, for example, in relation with FIG. 3, which the widget runtime relays to the widget portal 606 as depicted at 630, which in turn is recorded in the user account as depicted at 632.

Figure 7:
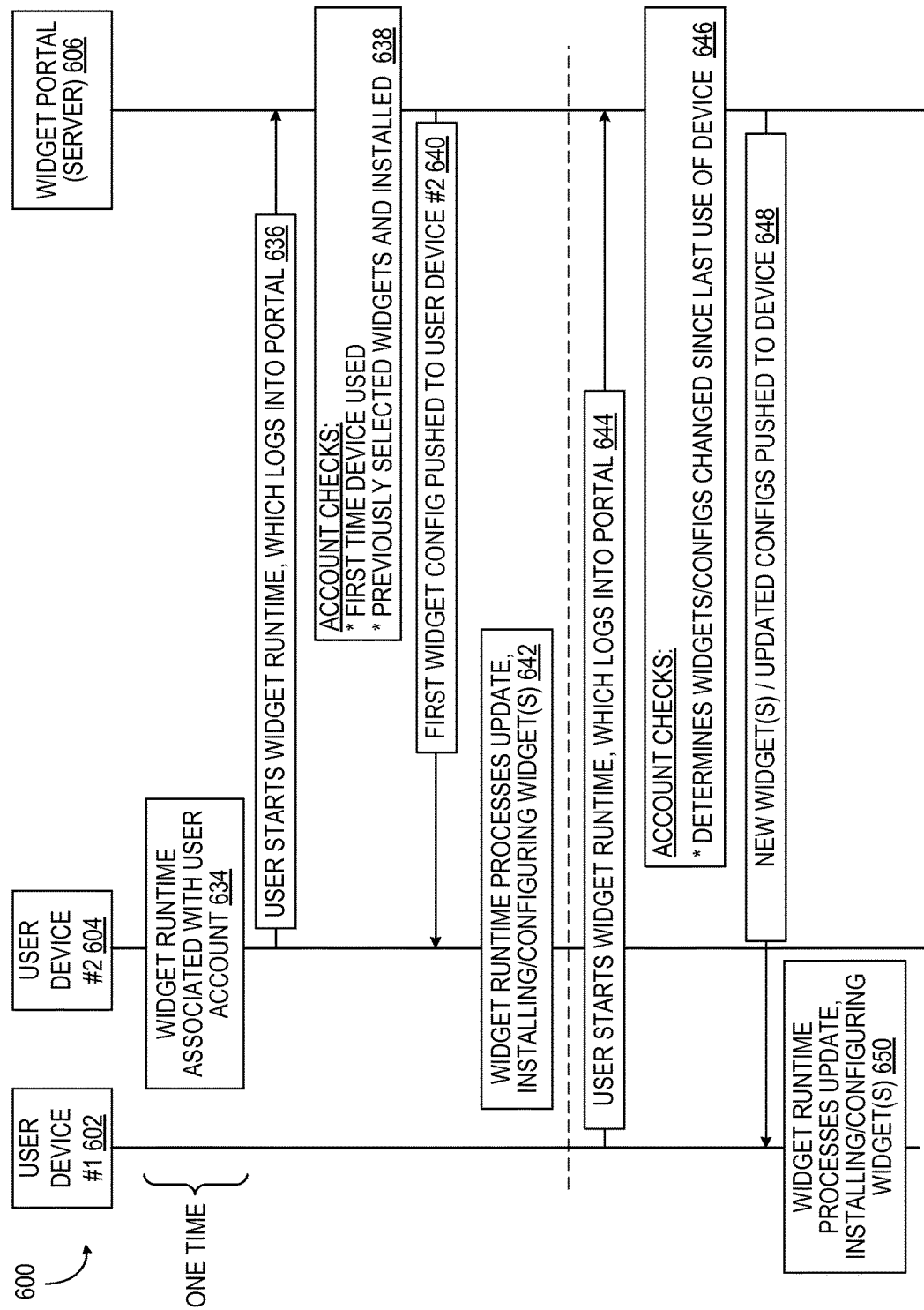

Continuing methodology 600 in FIG. 7, at 634, the user selected to execute a widget runtime on user device #2 604 for the first time associating the widget runtime with the username. Thereby, the widget runtime logs into portal 606, as depicted at 636. The widget portal 606 responds by performing account checks as depicted at 638, which in this instance determines that this is the first time that the particular device #2 604 has been used and that the user account reflects selected widgets and their configuration details not reported to be installed on device #2 604. The portal 606 pushes the selected widget(s) and their configuration details to the user device #2 604 as depicted at 640. The widget runtime on device #2 604 processes the update, installing and configuring the selected widget(s) as depicted at 642. At this point, both devices #1 and #2 602, 604 are initially synchronized.

With further reference to FIG. 7, the user can select to make configuration changes to the two devices #1 and #2 602, 604 that are associated with the user's username. At 644, the user starts the widget runtime on user device #1 602, which in turn logs into the widget portal 606. In response, at 646, widget portal 606 performs account checks determining which widgets and their configurations have changed, if any, in the user account since the last use of device #1 602. Any new widget(s) or updated configurations are then pushed from the portal 606 to the device #1 602 as depicted at 648. Next, at 650, the widget runtime processes the update, installing or configuring the widget(s) on user device #1 602.

Figure 8:
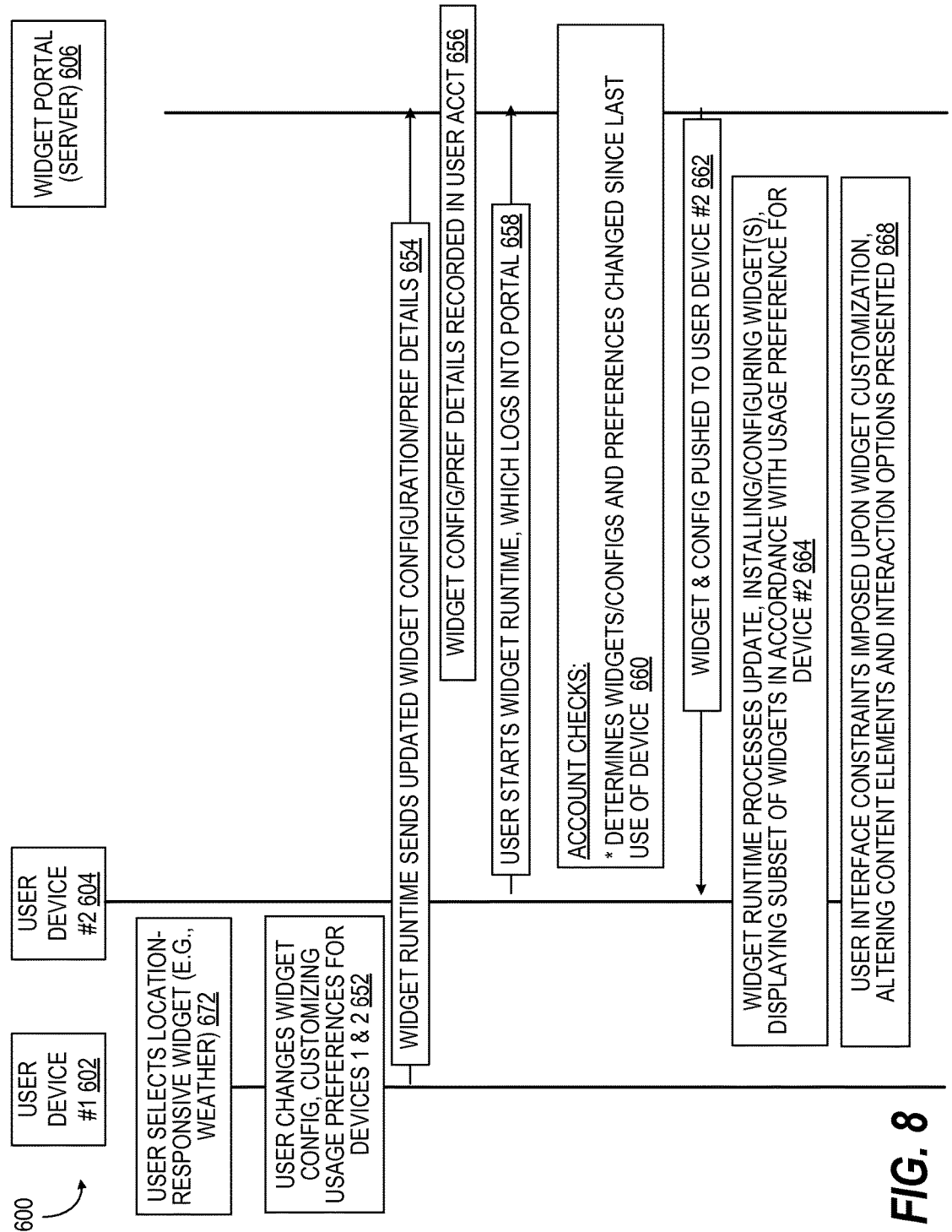

Continuing methodology 600 in FIG. 8, the user can elect to change widget configuration on device #1 602 as depicted at 652. Further, this customization can include preference changes that selectively affect either device #1 602 or device #2 604, such as specifying that one is for work usage and one is for personal usage. The configuration of a particular subset of widgets can specify whether they are appropriate for work usage or personal usage. For example, employer guidelines may preclude monitoring stock prices other than the employer's stock value on an employer provided computer. As another example, a widget can be inherently or explicitly appropriate for a mobile application, such as a current map location widget. The preference can thus be used to hide a map widget on a fixed location client device. As another example, a widget can be configured for display on both devices, but change configuration based upon the usage or device constraints. For instance, interactive features can change based upon the available user input controls. As another illustration, the widget can default to a detected location of a mobile communication device (e.g., weather widget, etc.) but change to a user selected location for another usage (e.g., a dispatcher who needs to see weather conditions in detail for dispatching other employees to various locations, etc.). In an aspect, at 672, the user may select a location responsive widget. A location responsive widget may be, for example, a weather widget, a map widget, a shopping widget, or a family RSS feeder, among other location responsive widgets.

At 654, the widget runtime sends the updated widget configuration/preferences details to the widget portal 606. In response, at 656, the widget configuration/preference details that may be recorded in the user account are updated by the widget portal 606. Then the user may start a widget runtime on device #2 604, which logs into the widget portal 606, as depicted at 658. The portal 606 performs an account check, determining what widgets, configurations, or preferences have changed since the last use of the device #2 604, as depicted at 660. If the configurations or preferences have changed, the portal 606 can determine whether to push an update to device #2 604, as depicted at 662. At 664, the widget runtime of the user device #2 604 process the update, installing, and configuring widget(s), which for instance can entail displaying a subset of selected widgets in accordance with usage preferences for the device #2 604. The widget runtime may configure and customize the widgets in accordance with user interface constraints, as depicted at 668. Such customization goes beyond merely resizing the graphical rendering of the widget to automatically or in accordance with user preferences to scale the content of the widget (e.g., amount of text, how the content is to be displayed, such as scrolling or alternating, presence or absence of graphics, and whether a subset of widgets has been selected for tiled presentation, time sequenced presentation, or scrolling presentation, either automatic or upon user scrolling input, etc.)

Figure 9:
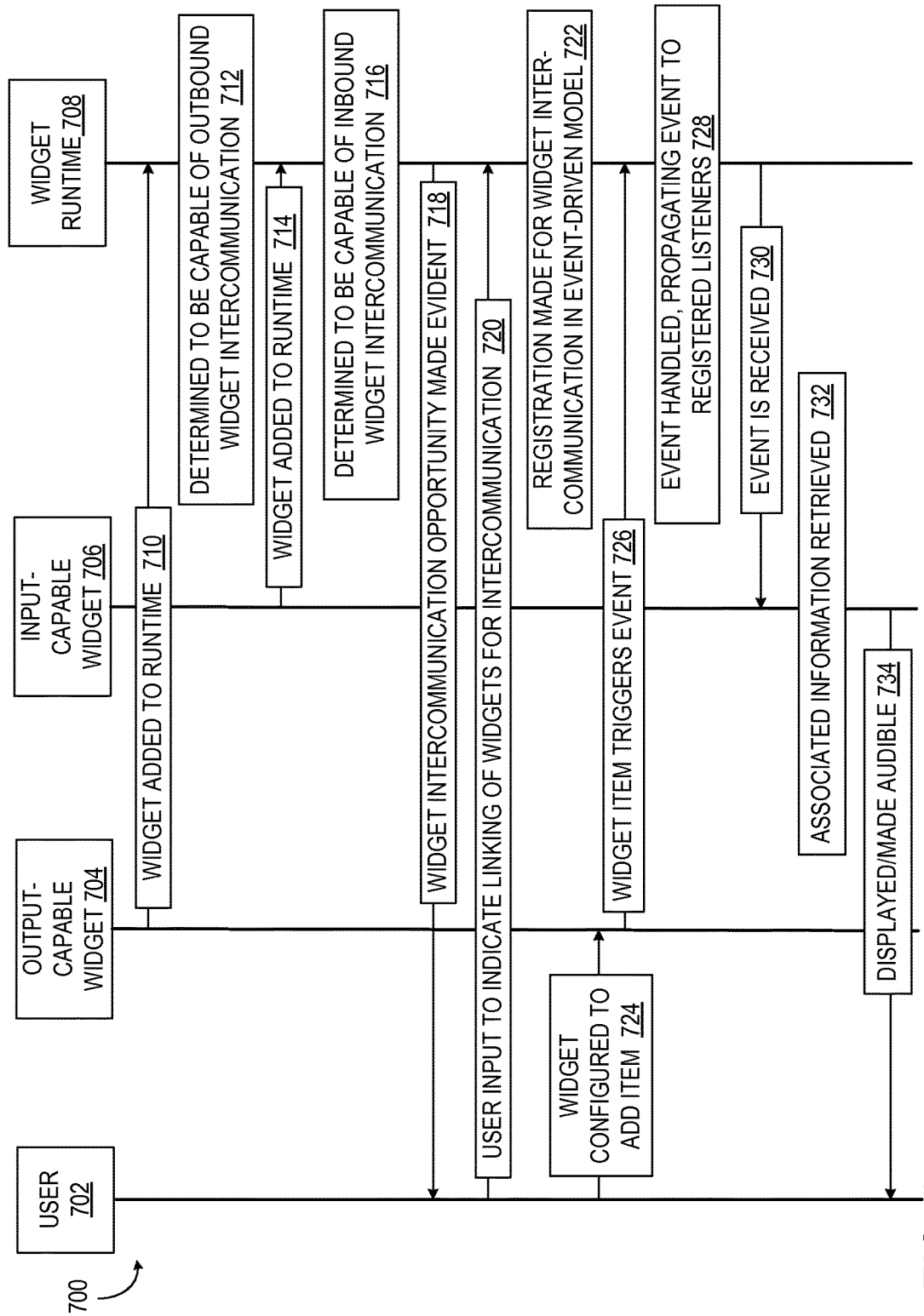
FIG. 9 illustrates an exemplary timing diagram for intercommunication of widgets; in accordance with an aspect.

In FIG. 9, a methodology 700 for widget intercommunication is depicted, for example, as a timing diagram between a user 702, an output-capable widget 704 (e.g., a stock ticker, etc.), an input capable widget 706 (e.g., a financial RSS feeder, etc.) and a widget runtime 708. At 710, a widget 704 is added to the runtime 708. The runtime 708 affirmatively determines whether the widget 704 is capable of outbound widget intercommunication, as depicted at 712. As depicted at 714, another widget 706 is added to the runtime 708. In response, the runtime 708 makes an affirmative determination that widget 706 is capable of inbound intercommunication, as depicted at 716. The runtime 708 can make an indication to the user, such as annotating with a male connector and/or female connector symbol or reflecting this status in a configuration window, to invite an interconnection, as depicted at 718.

A user makes an input indicating a desire to link widgets for intercommunication, as depicted at 720. The input indicating a desire to link widgets for intercommunication may include the user selecting from a drop-down menu to connect the widgets, the user performing a drag and drop operation to connect the widgets, the user selecting a radio button indicating the widgets should be connected, among other forms of input. Unless an error has to be returned by the runtime 708 for incompatible widgets 704, 706, the runtime 708 registers this intercommunication in an event-driven model, as depicted at 722. The output-capable widget 704 is configured to add an item, as depicted at 724. The widget 704 relays to the widget runtime 708 at some point that the added item has triggered an event, as depicted at 726. The runtime 708 handles the event, referencing the registration to determine registered listeners, as depicted at 728. As depicted at 730, the event is received by the registered, input-capable widget 706, which can retrieve associated information regarding the event as the widget is configured at 732 (e.g., retrieving a financial report link associated with a stock ticker symbol received from the other widget 704, etc.). This information is displayed/made audible by the widget 706 for the user 702 to perceive, as depicted in block 734.

Figures 10, 11:
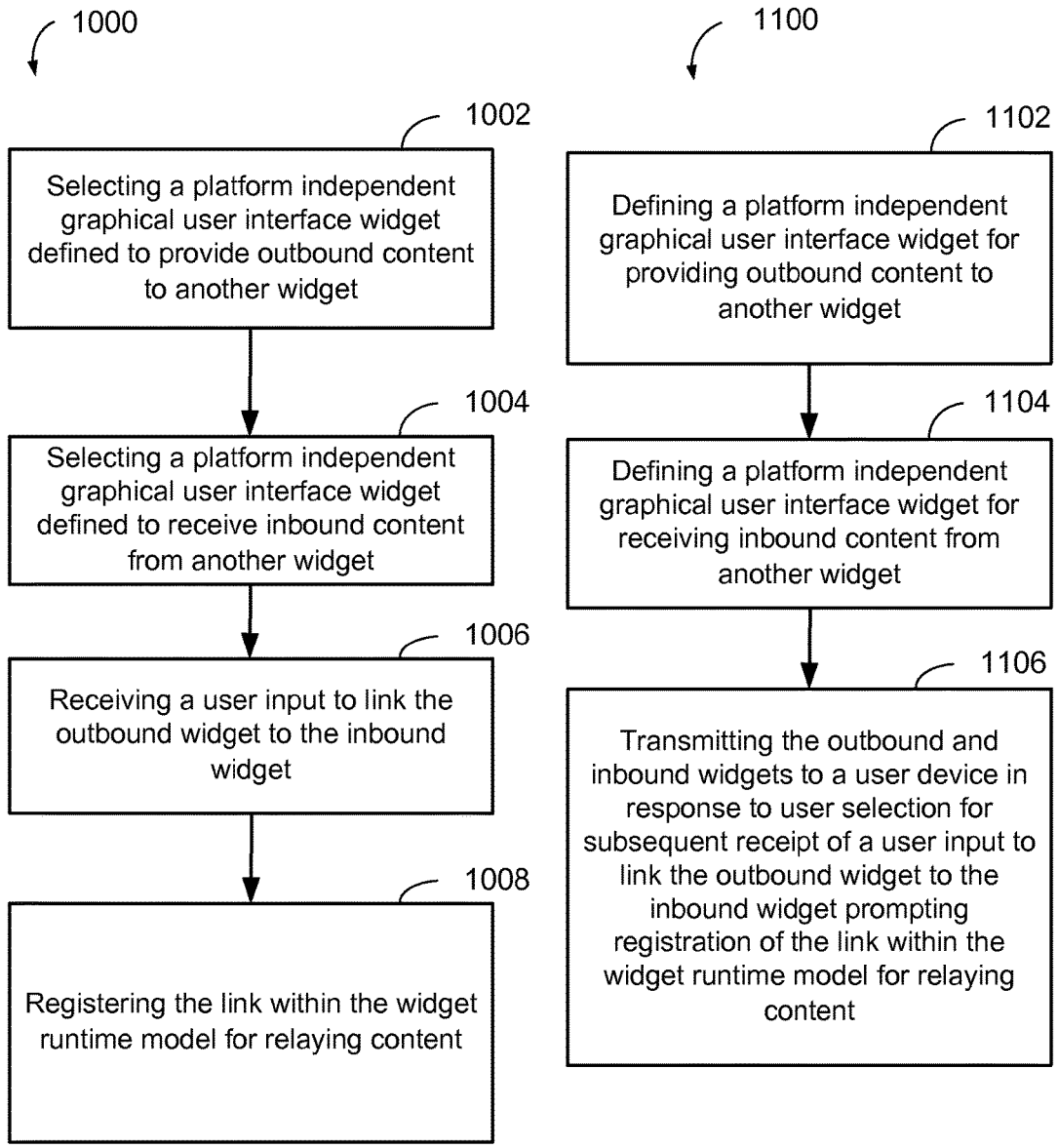
FIG. 10 illustrates an exemplary flow diagram of a method for dynamically exchanging content between application graphical user interface widgets in accordance with an aspect.
FIG. 11 illustrates an exemplary flow diagram of a method for dynamically exchanging content between application graphical user interface widgets in accordance with an aspect.

Turning now to FIG. 10, in one aspect of widget intercommunication, a method 1000 operable at a user device for dynamically exchanging content between application graphical user interface widgets executed on a widget runtime model of a computing platform on a user device may include selecting a platform independent graphical user interface widget defined to provide outbound content to another widget at 1002. For example, the outbound widget may include a financial news widget, or a location sensing widget, among other outbound widgets.

Further, the method may include selecting a platform independent graphical user interface widget defined to receive inbound content from another widget at 1004. For example, the inbound widget may include a web syndication widget among other inbound widgets.

In addition, the method may include receiving a user input to link the outbound widget to the inbound widget at 1006. For example, the user may link the widgets by performing a drag and drop cursor operation between the outbound widget and the inbound widget, use a graphical interface configuration window associated with the widget runtime model, or cancel the associated link between the outbound widget and the inbound widget. Moreover, the method may include registering the link within the widget runtime model for relaying content at 1108.

Turning now to FIG. 11, in another aspect of widget intercommunication, a method 1100 operable at a network device for dynamically exchanging content between application graphical user interface widgets executed on a widget runtime model of a computing platform on a user device is provided. The method can include defining a platform independent graphical user interface widget for providing outbound content to another widget at 1102. For example, the outbound widget may include a financial news widget, or a location sensing widget, among other outbound widgets.

The method may also include defining a platform independent graphical user interface widget for receiving inbound content from another widget at 1104. For example, the inbound widget may include a web syndication widget among other inbound widgets.

Further, the method may include transmitting the outbound and inbound widgets to a user device in response to user selection for subsequent receipt of a user input to link the output widget to the inbound widget at 1106. For example, such transmitting prompts registration of the link within the widget runtime model for relaying content.

Figures 12, 13:
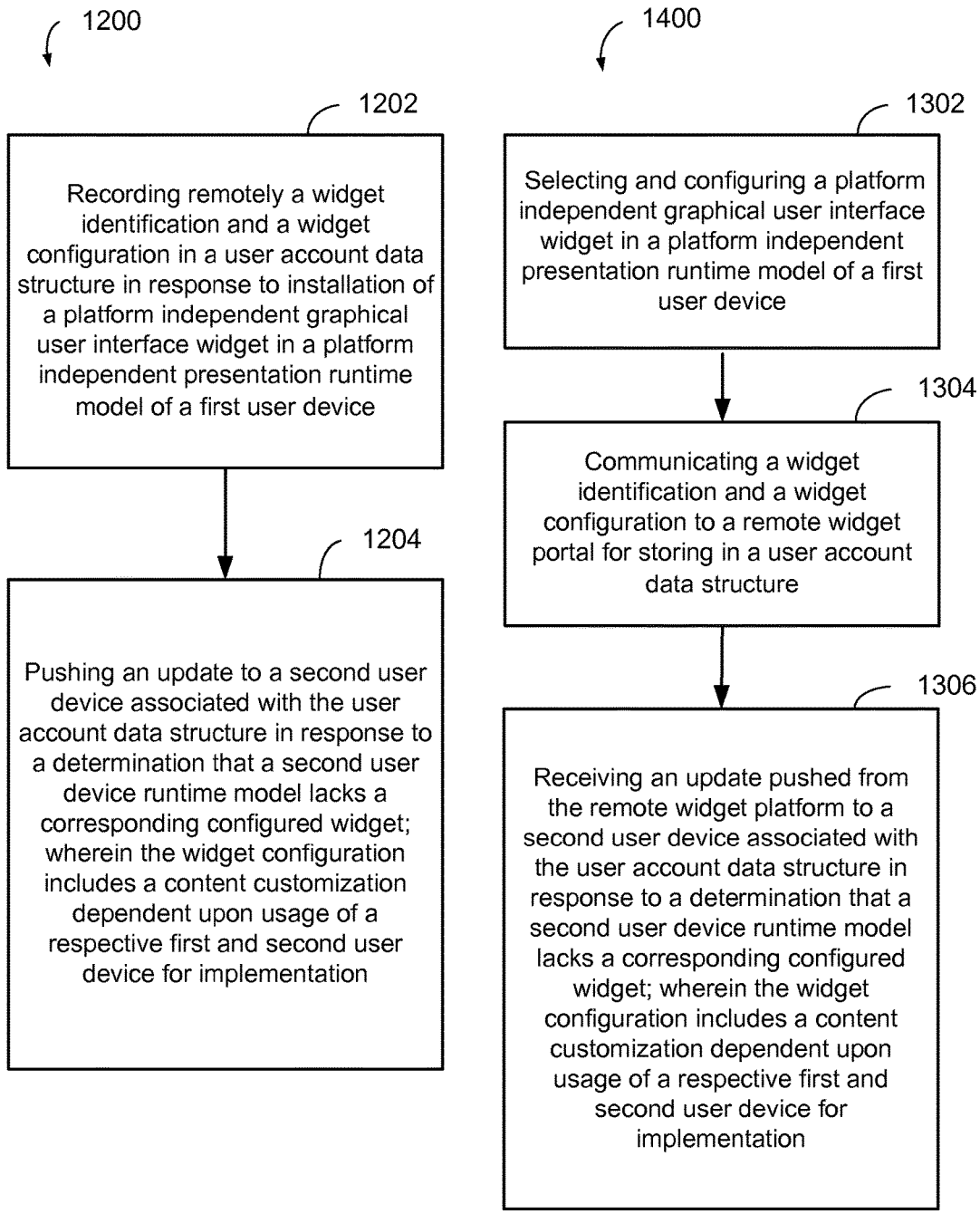
FIG. 12 illustrates an exemplary flow diagram of a method for dynamically synchronizing the layout of a migratable application graphical user interface widget in accordance with an aspect.
FIG. 13 illustrates an exemplary flow diagram of a method for dynamically synchronizing the layout of a migratable application graphical user interface widget in accordance with an aspect.

Referring to FIG. 12, in an aspect of customized synchronization of widgets, a method 1200 operable at a user device for dynamically synchronizing the layout of a migratable application graphical user interface widget between a plurality of heterogeneous device platforms is provided. The method may include recording remotely a widget identification and a widget configuration in a user account data structure in response to installation of a platform independent graphical user interface widget in a platform independent presentation runtime model of a first user device at 1202. For example, the user account may include whether this is a first time login for the user account, whether the widget has been previously installed on the one user device, whether a user input widget configuration change has been received subsequent to pushing a widget configuration to the one user device, among others.

Further, the method may include pushing an update to a second user device associated with the user account data structure in response to a determination that a second user device runtime model lacks a corresponding configured widget at 1204. The widget configuration can include a content customization dependent upon usage of a respective first and second user device for implementation. For example, the widget configuration may include designating the widget for presentation on one of the user devices and to exclude presentation on the other user device, or a user preference for priority for presenting the content of the widgets, among other widget configurations.

Referring to FIG. 13, in another aspect of customized synchronization of widgets, a method 1300 operable at a network device for dynamically synchronizing the layout of a migratable application graphical user interface widget on a user device that is one of a plurality of heterogeneous device platforms is provided. The method may include selecting and configuring a platform independent graphical user interface widget in a platform independent presentation runtime model of a first user device at 1302. The method may also include communicating a widget identification and a widget configuration to a remote widget portal for storing in a user account data structure at 1304. Further the method may include receiving an update pushed from the remote widget platform to a second user device associated with the user account data structure in response to a determination that a second user device runtime model lacks a corresponding configured widget at 1306. The widget configuration can include a content customization dependent upon usage of a respective first and second user device for implementation.

Turning now to FIG. 14, in an aspect of widget localization, a method 1400 operable at a user device for dynamically localizing content of an application graphical user interface widget executed on a widget runtime model of a computing platform on a user device is provided. The method can include configuring a platform independent graphical user interface widget that provides location-responsive content in a platform independent presentation runtime model by specifying a static geographic location at 1402. The method may further include receiving a configuration setting to configure the graphical user interface widget for a localized mode at 1404. Moreover, the method may include retrieving a geographic location for the user device at 1406. Furthermore, the method may include providing the geographic location to the widget runtime model for the widget to select appropriate location-responsive content at 1408.

Referring to FIG. 15, in another aspect of widget localization, a method 1500 operable at a network device for dynamically localizing content of an application graphical user interface widget executed on a widget runtime model of a computing platform on a user device is provided. The method includes defining a platform independent graphical user interface widget configurable to provide location-responsive content at 1502. Further, the method may include transmitting the widget to a platform independent presentation runtime model of a user device defaulting to a static geographic location at 1504. The runtime model receives a configuration setting to configure the graphical user interface widget for localized mode, retrieves a geographic location for the user device, and provides the geographic location to the widget to select appropriate location-responsive content.

Figure 16:
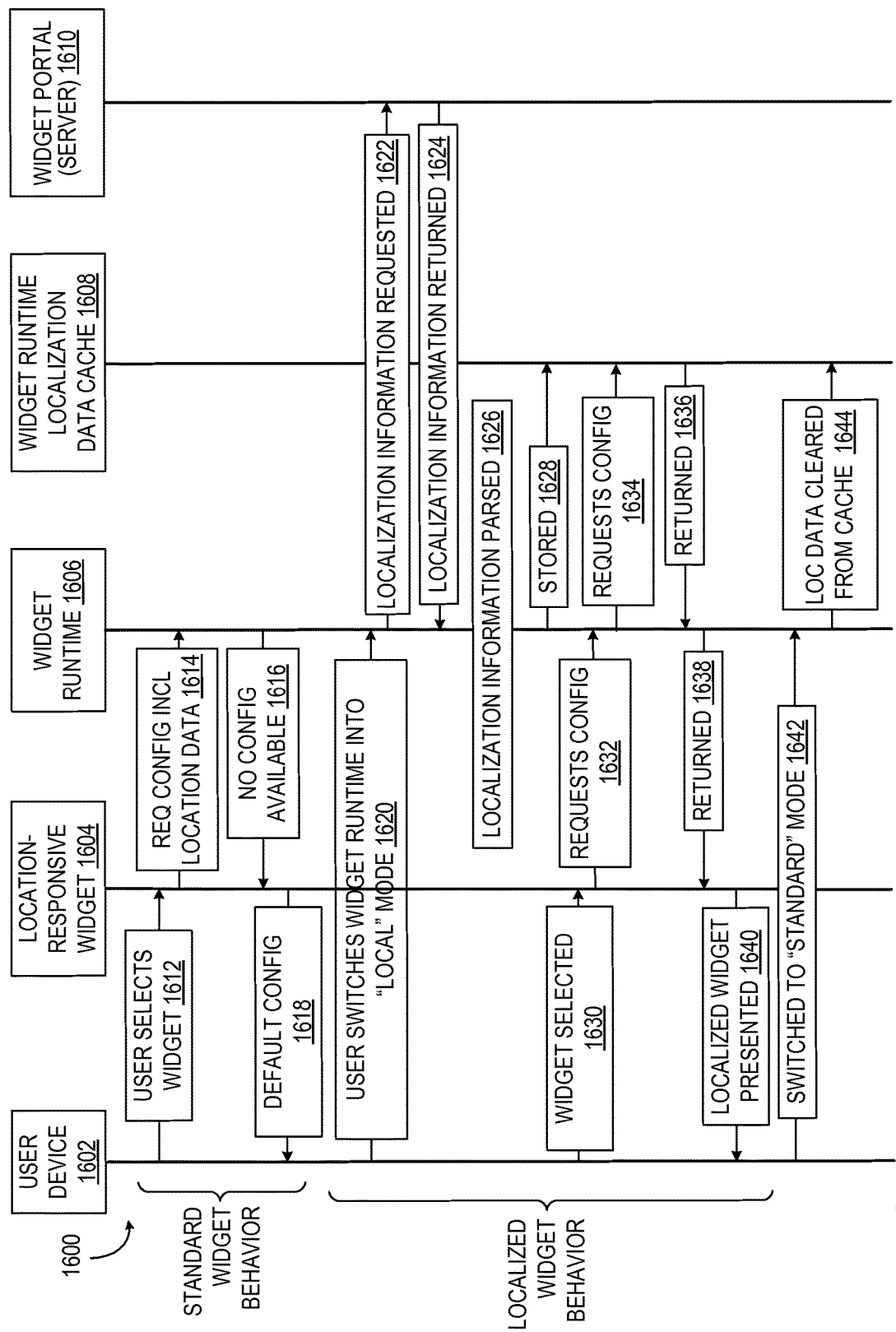
FIG. 16 illustrates an exemplary timing diagram for localization of widgets in accordance with an aspect.

Referring now to FIG. 16, illustrated is an exemplary call flow 1600 for customization specific to location configuration of widgets. A user 1602 is able to utilize a widget 1604 that is executed by a widget runtime (environment) 1606, which has access to a widget runtime localization data cache 1608 which in the illustrated example is in local storage and has communication access to a remote localization server (widget portal) 1610. As depicted at 1612, the user 1602 selects the location-responsive widget 1604, such as clicking a pointing device cursor on a weather widget on a displayed user interface (UI) widget selection window. The widget 1604 may respond by checking for localized configuration data via the widget runtime 1606 as depicted at 1614. The runtime 1606 may respond that no localized data exists for the widget 1604 and thus a default configuration should be used, as depicted at 1616. At 1618, the user 1602 may be notified that a default configuration should be used. In one aspect, operations 1612-1618 may be considered standard widget behavior.

Beginning as depicted at 1620, the user 1602 can elect that the widget 1604 perform a localized behavior. It should be appreciated that with the benefit of the present disclosure, the widget 1604 can automatically assume this method of operation. This setting can be made through the UI provided by the widget 1604 or through some other general interface provided by the widget runtime 1604. As depicted at 1622, the widget runtime 1606 requests localization information from the localization server 1610, which can entail network information based on radio reception between a node and a terminal, a global positioning system signal, a radio frequency identification (RFID) system, a navigation inertial platform, etc. The server 1610 returns the localization information as depicted at 1624, which is parsed by the widget runtime 1606, as depicted at 1626, and stored in localization data cache 1608 as depicted at 1628.

When the widget 1604 is active, such as being selected by the user 1602 as depicted at 1630, the widget 1604 retrieves the configuration, including a check for localization configuration data, as shown at 1632. The widget runtime 1606 fetches configuration from cached localized information, depicted at 1634 as a request followed by a data return at 1636. The widget runtime 1606 returns the localized configuration data to the widget 1604, as depicted at 1638. The user 1602 thus perceives local information (e.g., weather, map, recommended businesses, etc.), as depicted at 1640.

The user 1602 can subsequently decide to select a default location or to specify another location, such as local information at home while on travel elsewhere. Thus, as depicted at 1642, the user 1602 can switch the widget runtime 1606 back to "standard" mode, which can be implemented as depicted at 1644 by flushing the localized data from data cache 1008 to force subsequent requests to a default setting.

Figure 17:
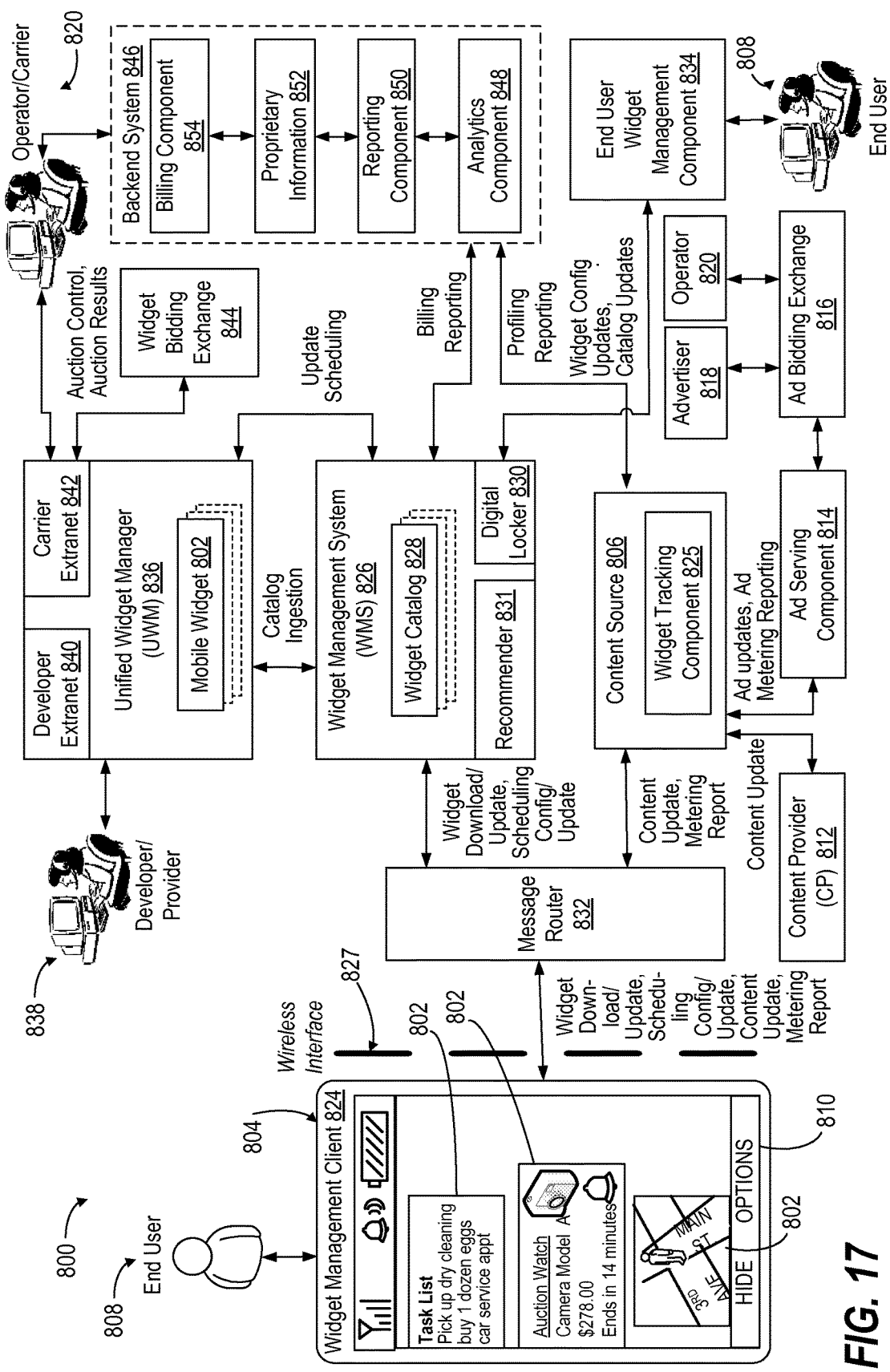
FIG. 17 illustrates a block diagram for a mobile widget system that provides an end-to-end architecture for the creation, storage, delivery, operation, and management of mobile widgets in a wireless network environment in accordance with an aspect.

Referring to FIG. 17, in one non-limiting aspect, a mobile widget system 800 provides an end-to-end architecture for the creation, storage, delivery, operation, and management of mobile widgets 802 in a wireless network environment. The mobile widget 802 can be a plurality of widgets 802, for example, a task list widget, an auction watch widget, and a map widget, among other widgets. The mobile widgets 802 can include a compact application or set of codes executable by a wireless communication device 804 to interact with a content source 806, such as a content access server, to retrieve content for presentation to a device end user 808 via a user interface 810, such as a display, on the device. In one non-limiting aspect, for example, mobile widget 802 may be a Really Simple Syndication (RSS) reader operable to retrieve a data feed from a news source and display the corresponding news item or headline(s) to allow end user 808 to view the latest news.

It should be noted, however, that mobile widget 802 is not limited to the prior example, and may have any functionality and may include any type of content. For example, mobile widget 802 may present any content generated by a content provider 812, including text, graphics, audio, video and multimedia content. Further, for example, content presentable by mobile widget 802 may include an advertisement, such as from an advertisement serving component 814, where the advertisement may be mixed with other content or may be the sole content. Advertisement serving component 814 may be a specialized version of content provider 806, supplying system 800 with advertising content, managing the placement of advertisements in system 800, and tracking feedback relating to the usage of advertisements on wireless communication devices 804. Additionally, advertisement serving component 814 may be operable to interface with an advertisement virtual negotiation component 816, such as an advertisement bidding exchange, which provides advertisers 818 and an operator 822 of system 800 with a virtual marketplace to enable the placement and management of advertising content within system 800.

Further, in system 800, wireless communication device 804 provides a platform for the storage, operation, and management of mobile widget 802 for end user 808. For example, wireless communication device 804 may include a widget management client (WMC) 824 that is executable to obtain one or more mobile widgets 802, such as from a widget management system 826. Additionally, WMC 824 may be executable to supervise mobile widget operation, and to track mobile widget activities on wireless communication device 804 and report such activities to a widget tracking component 825.

Widget management system (WMS) 826 is operable to communicate with WMC 824, for example via a wireless interface 827 and a message router component 832, and includes one or more catalogs 828 of one or more widgets 802 available for purchase and/or download to wireless communication device 804. WMS 826 may include a digital locker 830 operable to store records of each widget 802 downloaded to each device 804, as well as the corresponding configuration of each widget 802 on each device 804. A widget configuration may include settings relating to an appearance of widget 802, as well as an operation of widget 802, including one or more content update settings. In conjunction with providing access to widget catalogs 828 and widgets 802, WMS 826 optionally may include a widget recommender 831 to provide end user 808 with advice, suggestions, or recommendations of mobile widgets 802 that may be of benefit or of interest to end user 808.

As noted, message router component 832 is operable to interface between WMC 824 and the widget-supplying and content-supplying components of system 800. In particular, message router component 832 provides the interface with WMS 826 and content source 806 to exchange messages relating to downloading mobile widget 802, configuring mobile widget 802, updating mobile widget content, scheduling of content updates, and reporting of data tracking the activity of or end user interaction with mobile widget 802. As such, in some aspects, message router component 832 defines a network element that manages and controls all communications with WMC 824.

Further, in some aspects, system 800 may include an end user widget management component 834 that allows end user 808 to access WMS 826 to inquire about available mobile widgets 802 and widget catalogs 828. Further, end user widget management component 834 allows end user 808 to configure the functionality and appearance of mobile widget 802 on wireless communication device 804. As such, end user widget management component 834 provides end user 808 with alternative interface for mobile widget management.

In system 800, WMS 826 may obtain mobile widget 802 and widget catalog 828 from a unified widget manager (UWM) 836. UWM 836 provides a controlled point-of-entry into system 800 for mobile widget 802. In particular, UWM 836 may be operable to insure that each mobile widget 802 meets one or more predetermined architectural and/or operational widget standards for functioning within system 800. Additionally, UWM 836 provides a common, virtual marketplace that enables one or more mobile widget developers/providers 838 to introduce their respective mobile widget 802 to an operator 822, such as a wireless network carrier, of system 800. For example, widget developers/providers 838 may submit one or more mobile widgets 802 to UWM 836 via a developer interface 840, and operator/carrier 820 may access and review mobile widgets 802 at UWM 836 via an operator interface 842, where developer and operator interfaces 840 and 842 may be a network-accessible interface such as an extranet. Further, for example, via UWM 836, one or more developers/providers 838 and one or more operators/carriers 820 may access a widget virtual negotiation component 844, such as a widget bidding exchange, where an agreement may be reached regarding one or more of mobile widget pricing, mobile widget operation, mobile widget content updating, mobile widget placement in widget catalogs, mobile widget billing, developer/provider compensation, or operator/carrier mobile widget cost in system 800.

Additionally, in some aspects, system 800 may have a backend system 846 for analyzing the tracked data and transactions within system 800. In particular, backend system 846 may include an analytics component 848 that receives and examines the data of system 800, and a reporting component 850 that generates reports, including operator/carrier proprietary information 852, based on the results of the analysis of analytics component 1836. Further, backend system 846 may include a billing component 854 that accounts for transactions in system 800 and debits and/or credits one or more end users 808, developers/providers 838, operators/carriers 820, or advertisers 818. For example, end user 808 may purchase and download mobile widget 802 to a respective wireless communication device 804. This purchase transaction may be recorded by WMS 826 and reported to analytics component 848, which extracts relevant information for use by reporting component 850 and/or billing component 854 to generate, respectively, an accounting of the transaction and a bill or invoice corresponding to the transaction. The accounting and the billing may represent, for example, one or more of a purchase price/account receivable to be debited to an end user account, an operator/carrier account payable to be credited to an operator/carrier account, a developer/provider account payable to be credited to a developer/provider account, or an advertiser account receivable to be debited to an advertiser account.

It should be noted that the components within and functionalities provided by system 800 may be configured in any manner. For example, the various functionalities of any single system component alternately may be performed by individual system components. As such, it should be noted that the aspects of system 800 may be rearranged in any of a variety of manners, and yet still achieve the stated functionality.

Thus, system 800 provides one aspect of an end-to-end system for managing mobile widgets in a wireless network environment. Further details of the various system components and their aspects will now be discussed.

Figure 18:
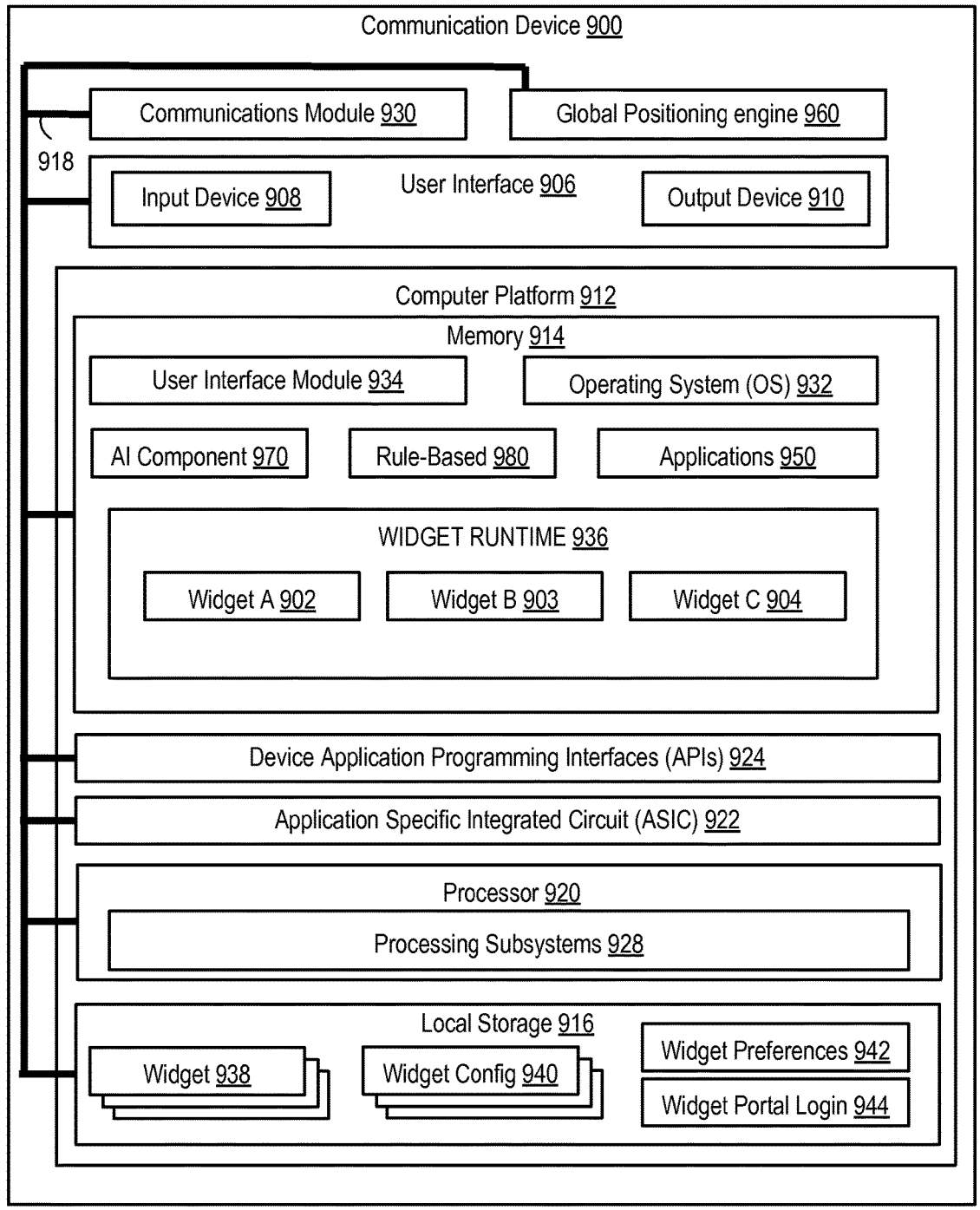
FIG. 18 illustrates a block diagram of a computing platform of a user device in accordance with an aspect.

In FIG. 18, a user device is depicted as a mobile communication device 900 that may comprise any type of computerized, communication device. For example, the communication device 900 may comprise a mobile communication device, such as a wireless and/or cellular telephone. Alternatively, the communication device 900 may comprises a fixed communication device, such as a Proxy Call/Session Control Function (P-CSCF) server, a network device, a server, a computer workstation, etc. It should be understood that communication device 900 is not limited to such a described or illustrated devices, but may further include a Personal Digital Assistant (PDA), a two-way text pager, a portable computer having a wired or wireless communication portal, and any type of computer platform having a wired and/or wireless communications portal. Further, the communication device 900 can be a remote-slave or other similar device, such as remote sensors, remote servers, diagnostic tools, data relays, and the like, which does not have an end-user thereof, but which simply communicates data across a wireless or wired network. In alternate aspects, the communication device 900 may be a wired communication device, such as a landline telephone, personal computer, set-top box or the like. Additionally, it should be noted that any combination of any number of communication devices 900 of a single type or a plurality of the aforementioned types may be utilized in the widget intercommunication system 100 (FIG. 1). Therefore, the present apparatus and methods can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof.

Additionally, the communication device 900 may include a user interface 906 for purposes such as requesting, interacting with, and/or configuring widgets 902-904. This user interface 906 includes an input device 908 operable to generate or receive a user input into the communication device 900, and an output device 910 operable to generate and/or present information for consumption by the user of the communication device 900. For example, input device 906 may include at least one device such as a keypad and/or keyboard, a mouse, a touch-screen display, a microphone in association with a voice recognition module, etc. In certain aspects, input device 908 may provide for user input of a request for content or for user input of a request for additional information. Further, for example, output device 910 may include a display, an audio speaker, a haptic feedback mechanism, etc. Output device 910 may generate a graphical user interface, a sound, a feeling such as a vibration, etc., and such outputs may be associated, for example, with the presentation of media content 14 (FIG. 1).

Further, communication device 900 may include a computer platform 912 operable to execute applications to provide functionality to the device 900, and which may further interact with input device 908 and output device 910. Computer platform 912 may include a memory, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory may include active memory and storage memory, including an electronic file system and any secondary and/or tertiary storage device, such as magnetic media, optical media, tape, soft and/or hard disk, and removable memory components. In the illustrative version, memory is depicted as RAM memory 914, a nonvolatile local storage unit 916, each connected to a data bus 918 of the computer platform.

Further, computer platform 912 may also include a processor 920, which may be an application-specific integrated circuit (ASIC), or other chipset, processor, logic circuit, or other data processing device. In some aspects, such as when communication device 900 comprises a cellular telephone, processor or other logic such as an application specific integration circuit (ASIC) 922 may execute an application programming interface (API) layers 924 that interfaces with any resident software components, such as voice call, data call, and media-related applications in memory 914.

Additionally, processor 920 may include various processing subsystems 928 embodied in hardware, firmware, software, and combinations thereof, that enable the functionality of communication device 900 and the operability of the communication device 900 on widget intercommunication system 100 (FIG. 1). For example, processing subsystems 928 allow for initiating and maintaining communications, and exchanging data, with other networked devices as well as within and/or among components of communication device 900. In one aspect, such as in a cellular telephone, processor 920 may include one or a combination of processing subsystems 928, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 928 of processor 920 may include any subsystem components that interact with applications executing on computer platform 912.

Computer platform 912 may further include a communications module 930 that enables communications among the various components of communication device 900, as well as being operable to exchange media content 14 and content requests between the communication device 900 and communications network 103. Communications module 930 may be embodied in hardware, firmware, software, and/or combinations thereof, and may further include all protocols for use in intra-device and inter-device communications. Further, communications module 930 is operable to transmit and/or receive information, such as requesting and receiving widgets 902-904 in accordance with the apparatus and methods described herein.

Certain of these capabilities of the communication device 900 can be facilitated by code loaded from local storage 916, retained in memory 914, and executed by the processor 920, such as an operating system (OS) 932. A user interface module 934 facilitates interactive control with the user interface 930. A widget runtime application 936 resides in memory 914 for providing a computer platform independent environment for executing widgets 902-904. The runtime application 936 accesses stored widget copies 940, widget configuration files 942, widget preference data structure 944, and widget portal login data 946 in local storage 916. Other applications 950 may be active in memory 914 for other functions (e.g., communication call control, alarm clock, text messaging, etc.).

Computer platform 912 may further include a GPS engine 560 or other location sensing components provide location information of the communication device 900.

In order to distribute computational overhead and/or to reduce transmission overhead on the widget localization system 100 (FIG. 1), an artificial intelligence (AI) component 970 and/or a rule-based logic component 980 can infer user behavior for reporting, make decisions as to when a reportable fault related event has occurred, and/or extrapolate location based on intermittent location sensing, etc, or to diagnose the cause of a failure.

The rules-based logic component 980 can be employed to automate certain functions described or suggested herein. In accordance with this alternate aspect, an implementation scheme (e.g., rule) can be applied to define types of attributes that should be acted upon or ignored, create rules that are aware of location sensing status, performance delays in certain components of the computing platform that would be deemed by the user to be a failure or poor performance, etc. By way of example, it will be appreciated that the rule-based implementation can automatically apply constraints that are predicted to match user preferences The AI component 970 can facilitate automating performance of one or more features described herein such as learning what is normal and abnormal performance of a wireless mobile device, perhaps before and after a change in software installed or executed, extrapolating intermittent location data, adjusting user feedback provided to a user based on machine learning. Thus, employing various AI-based schemes can assist in carrying out various aspects thereof.

A classifier is a function that maps an input attribute vector, x=(x1, x2, x3, x4, xn), to a class label class(x). A classifier can also output a confidence that the input belongs to a class, that is, f(x)=confidence(class(x)). Such classification can employ a probabilistic and/or statistical-based analysis (e.g., factoring into the analysis utilities and costs, etc.) to infer an action that a user desires to be automatically performed.

A support vector machine (SVM) is an example of a classifier that can be employed. The SVM operates by finding a hypersurface in the space of possible inputs that splits in an optimal way the triggering input events from the non-triggering events. Other classification approaches, including Naïve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the subject invention can employ classifiers that are pre-trained (e.g., via a generic training data from multiple users, etc.) as well as methods of reinforcement learning (e.g., via observing user behavior, observing trends, receiving extrinsic information, etc.). Thus, the subject invention can be used to automatically learn and perform a number of functions, including but not limited to determining, according to a predetermined criteria.

Figure 19:
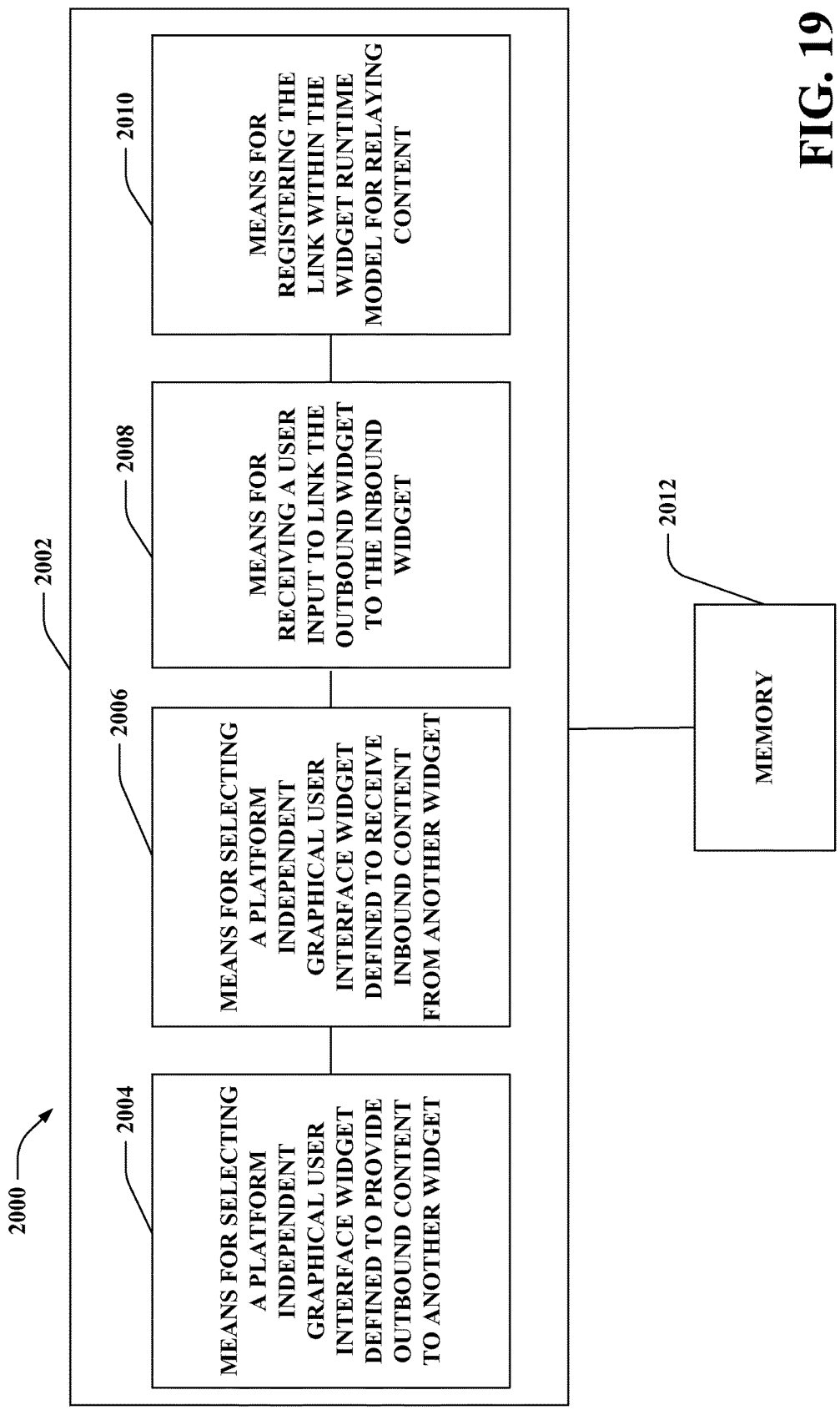
FIG. 19 is an illustration of an example system that facilitates dynamically exchanging content between application graphical user interface widgets executed on a widget runtime model in accordance with an aspect.

Referring now to FIG. 19, illustrated is a system 1100 that dynamically exchanges content between application graphical user interface widgets executed on a widget runtime model, according to one example. System 1100 can reside within a multiplexer, transmitter, mobile device, etc., for instance. As depicted, system 1100 includes functional blocks that can represent functions implemented by a processor, software, or combination thereof (e.g., firmware, etc.). System 1100 includes a logical grouping 1102 of electrical components that facilitate dynamically exchanging content between application graphical user interface widgets executed on a widget runtime model of a computing platform on a user device. Logical grouping 1102 can include means for selecting a platform independent graphical user interface widget defined to provide outbound content to another widget 1104. Moreover, logical grouping 1102 can include means for selecting a platform independent graphical user interface widget defined to receive inbound content from another widget 1106. In addition, logical grouping 1102 can include means for receiving a user input to link the outbound widget to the inbound widget 1108. Further, logical grouping 1102 can include means for registering the link within the widget runtime model for relaying content 1110. Additionally, system 1100 can include a memory 1112 that retains instructions for executing functions associated with electrical components 1104, 1106, 1108, and 1110. While shown as being external to memory 1112, it is to be understood that electrical components 1104, 1106, 1108, and 1110 can exist within memory 1112.

Referring now to FIG. 20, illustrated is a system 1200 that dynamically exchanges content between application graphical user interface widgets executed on a widget runtime model, according to one aspect. System 1200 can reside within a multiplexer, transmitter, mobile device, etc., for instance. As depicted, system 1200 includes functional blocks that can represent functions implemented by a processor, software, or combination thereof (e.g., firmware, etc.). System 1200 includes a logical grouping 1202 of electrical components that facilitate dynamically exchanging content between application graphical user interface widgets executed on a widget runtime model of a computing platform on a user device. Logical grouping 1202 can include means for defining a platform independent graphical user interface widget for providing outbound content to another widget 1204. Moreover, logical grouping 1202 can include means for defining a platform independent graphical user interface widget for receiving inbound content from another widget 1206. Further, logical grouping 1202 can include means for transmitting the outbound and inbound widgets to a user device in response to user selection for subsequent receipt of a user input to link the outbound widget to the inbound widget prompting registration of the link within the widget runtime model for relaying content 1208. Additionally, system 1200 can include a memory 1210 that retains instructions for executing functions associated with electrical components 1204, 1206, and 1208. While shown as being external to memory 1210, it is to be understood that electrical components 1204, 1206, and 1208 can exist within memory 1210.

Various examples are discussed below of the described aspects. For example, in one aspect, a method is provided for dynamically synchronizing the layout of a migratable application graphical user interface widget between a plurality of heterogeneous device platforms. Widget identification and a widget configuration is remotely recorded in a user account data structure in response to installation of a platform independent graphical user interface widget in a platform independent presentation runtime model of a first user device. An update to a second user device associated with the user account data structure is pushed in response to a determination that a second user device runtime model lacks a corresponding configured widget. The widget configuration includes a content customization dependent upon usage of a respective first and second user device for implementation.

The method may further include receiving a user input specifying a usage distinction for the second user device. In addition, the method may further include storing a user preference as part of the widget configuration to selectively designate the widget for presentation on one of the user devices and to exclude presentation on the other one of the user devices. The usage distinction may be selected from a group consisting of work and home.

In addition, the method may also include pushing a widget to one of the user devices that comprises a plurality of content items for allowing a runtime model to selectively display a subset of the plurality of content items to remain within constraints of a user interface. Moreover, the method may further include receiving a user preference for priority in a method for constraining presented content of widgets; and pushing the priority user preference to one of the user devices as an update. Alternatively, or in addition to, the method may further include enabling the user device via the update to select a content reduction option taken from a group consisting of scrolling at least a portion of content, omitting a graphic of the widget, and time sequencing a plurality of widgets.

Further, the method may include pushing a widget to one of the user devices that comprises an association with mobile user device usage for allowing a runtime model to selectively display the widget depending upon whether the user device is mobile.

Additionally, the method may further include performing a user account check upon login by one of the user devices to determine according to the user account data structure if a first time login, whether the widget has been previously installed on the one user device, and whether a user input widget configuration change has been received subsequent to pushing a widget configuration to the one user device.

In another aspect, for example, at least one processor is provided for dynamically synchronizing the layout of a migratable application graphical user interface widget between a plurality of heterogeneous device platforms. A first module records remotely a widget identification and a widget configuration in a user account data structure in response to installation of a platform independent graphical user interface widget in a platform independent presentation runtime model of a first user device. A second module pushes an update to a second user device associated with the user account data structure in response to a determination that the second user device runtime model lacks a corresponding configured widget. The widget configuration includes a content customization dependent upon usage of a respective first and second user device for implementation.

For example, in an additional aspect, a computer program product is provided for dynamically synchronizing the layout of a migratable application graphical user interface widget between a plurality of heterogeneous device platforms. A computer-readable medium comprises instructions for causing a computer to record remotely a widget identification and a widget configuration in a user account data structure in response to installation of a platform independent graphical user interface widget in a platform independent presentation runtime model of a first user device, and to push an update to a second user device associated with the user account data structure in response to a determination that the second user device runtime model lacks a corresponding configured widget. The widget configuration includes a content customization dependent upon usage of a respective first and second user device for implementation.

In a further aspect, for example, an apparatus is provided for dynamically synchronizing the layout of a migratable application graphical user interface widget between a plurality of heterogeneous device platforms. The apparatus includes means for recording remotely a widget identification and a widget configuration in a user account data structure in response to installation of a platform independent graphical user interface widget in a platform independent presentation runtime model of a first user device. The apparatus further includes means for pushing an update to a second user device associated with the user account data structure in response to a determination that the second user device runtime model lacks a corresponding configured widget. The widget configuration includes a content customization dependent upon usage of a respective first and second user device for implementation.

In another additional aspect, an apparatus is provided for dynamically synchronizing the layout of a migratable application graphical user interface widget between a plurality of heterogeneous device platforms. Network storage records remotely a widget identification and a widget configuration in a user account data structure in response to installation of a platform independent graphical user interface widget in a platform independent presentation runtime model of a first user device. A synchronization component pushes an update to a second user device via the communication component associated with the user account data structure in response to a determination that the second user device runtime model lacks a corresponding configured widget. A communication component communicates remotely to the first and second user devices. The widget configuration includes a content customization dependent upon usage of a respective first and second user device for implementation.

The apparatus may further include the communication component receiving a user input specifying a usage distinction for the second user device. The apparatus may further include the synchronization component storing a user preference in the network storage as part of the widget configuration to selectively designate the widget for presentation on one of the user devices and to exclude presentation on the other one of the user devices. In addition, the apparatus may further include the communication component receiving a usage distinction selected from a group consisting of work and home stored by the network storage.

The apparatus may further include the synchronization component pushing a widget to one of the user devices that comprises a plurality of content items for allowing a runtime model to selectively display a subset of the plurality of content items to remain within constraints of a user interface. In addition, the apparatus may further include the communication component receiving a user preference for priority in an apparatus for constraining presented content of widgets. The apparatus further includes the synchronization component pushing the priority user preference to one of the user devices as an update. Alternatively, or in addition to, the apparatus may further include the synchronization component enabling the user device via the update to select a content reduction option taken from a group consisting of scrolling at least a portion of content, omitting a graphic of the widget, and time sequencing a plurality of widgets.

Moreover, the apparatus may further include the synchronization component pushing a widget to one of the user devices that comprises an association with mobile user device usage for allowing a runtime model to selectively display the widget depending upon whether the user device is mobile.

In addition, the apparatus may further include the synchronization component performing a user account check upon login by one of the user devices to determine based upon the user account data structure if a first time login, whether the widget has been previously installed on the one user device, and whether a user input widget configuration change has been received subsequent to pushing a widget configuration to the one user device.

In yet one other aspect, for example, a method is provided for dynamically synchronizing the layout of a migratable application graphical user interface widget on a user device that is one of a plurality of heterogeneous device platforms. A platform independent graphical user interface widget is selected and configured in a platform independent presentation runtime model of a first user device. A widget identification and a widget configuration are communicated to a remote widget portal for storing in a user account data structure. An update is received that is pushed from the remote widget platform to a second user device associated with the user account data structure in response to a determination that a second user device runtime model lacks a corresponding configured widget. The widget configuration includes a content customization dependent upon usage of a respective first and second user device for implementation.

The method may further include receiving a user input specifying a usage distinction for the second user device. The method may further include communicating a user preference based upon the user input to the remote widget portal as part of the widget configuration to selectively designate the widget for presentation on one of the user devices and to exclude presentation on the other one of the user devices. In addition, the method may further include receiving a usage distinction selected from a group consisting of work and home.

Further, the method may include receiving a widget on one of the user devices pushed from the remote widget portal that comprises a plurality of content items, and selectively displaying a subset of the plurality of content items to remain within constraints of a user interface of the one user device. In addition, the method may further include receiving a user preference input on the first user device for priority in a method for constraining presented content of widgets, and receiving the priority user preference on the second user device pushed from the remote widget portal as an update. Alternatively, or in addition to, the method may further include selecting a content reduction option for presenting the widget taken from a group consisting of scrolling at least a portion of content, omitting a graphic of the widget, and time sequencing a plurality of widgets.

Moreover, the method may further include receiving a widget on one of the user devices from the remote widget portal that comprises an association with mobile user device usage, and selectively display the widget depending upon a determination of whether the one user device is mobile.

In addition, the method may further include performing logging into the remote widget portal via one of the user devices to prompt a remote user account check to determine according to the user account data structure if a first time login, whether the widget has been previously installed on the one user device, and whether a user input widget configuration change has been received subsequent to pushing a widget configuration to the one user device.

In yet another aspect, for example, at least one processor is provided for dynamically synchronizing the layout of a migratable application graphical user interface widget on a user device that is one of a plurality of heterogeneous device platforms. A first module selects and configures a platform independent graphical user interface widget in a platform independent presentation runtime model of a first user device. A second module communicates a widget identification and a widget configuration to a remote widget portal for storing in a user account data structure. A third module receives an update pushed from the remote widget platform to a second user device associated with the user account data structure in response to a determination that a second user device runtime model lacks a corresponding configured widget. The widget configuration includes a content customization dependent upon usage of a respective first and second user device for implementation.

For example, in yet an additional aspect, a computer program product is provided for dynamically synchronizing the layout of a migratable application graphical user interface widget on a user device that is one of a plurality of heterogeneous device platforms. A computer-readable medium comprises instructions for causing a computer to elect and configure a platform independent graphical user interface widget in a platform independent presentation runtime model of a first user device, to communicate a widget identification and a widget configuration to a remote widget portal for storing in a user account data structure, and to receive an update pushed from the remote widget platform to a second user device associated with the user account data structure in response to a determination that a second user device runtime model lacks a corresponding configured widget. The widget configuration includes a content customization dependent upon usage of a respective first and second user device for implementation.

In yet a further aspect, an apparatus is provided for dynamically synchronizing the layout of a migratable application graphical user interface widget on a user device that is one of a plurality of heterogeneous device platforms. The apparatus includes means for selecting and configuring a platform independent graphical user interface widget in a platform independent presentation runtime model of a first user device. The apparatus further includes means for communicating a widget identification and a widget configuration to a remote widget portal for storing in a user account data structure. Additionally, the apparatus includes means for receiving an update pushed from the remote widget platform to a second user device associated with the user account data structure in response to a determination that a second user device runtime model lacks a corresponding configured widget. The widget configuration includes a content customization dependent upon usage of a respective first and second user device for implementation.

In yet another additional aspect, an apparatus is provided for dynamically synchronizing the layout of a migratable application graphical user interface widget on a user device that is one of a plurality of heterogeneous device platforms. Each of a first and second user devices comprise a computing platform, a platform independent presentation runtime model executed on the computing platform, and a user interface for selecting and configuring a platform independent graphical user interface widget, and a communication component. The latter is for communicating a widget identification and a widget configuration to a remote widget portal for storing in a user account data structure and for receiving an update pushed from the remote widget platform associated with the user account data structure in response to a determination that a corresponding user device runtime model lacks a corresponding configured widget. The widget configuration includes a content customization dependent upon usage of the respective user device for implementation.

The apparatus may further include the user interface for receiving a user input specifying a usage distinction for the second user device. The apparatus may further include the communication component for communicating a user preference based upon the user input to the remote widget portal as part of the widget configuration to selectively designate the widget for presentation on one of the user devices and to exclude presentation on the other one of the user devices. In addition, the apparatus may include the communication component receiving a usage distinction selected from a group consisting of work and home.

Further, the apparatus may include the communication component receiving a widget on one of the user devices pushed from the remote widget portal that comprises a plurality of content items, and the widget runtime model for selectively displaying a subset of the plurality of content items on the user interface to remain within constraints of a user interface of the one user device. In addition, the apparatus may include the user interface for receiving a user preference input on the first user device for priority in a method for constraining presented content of widgets, and the communication component for receiving the priority user preference on the second user device pushed from the remote widget portal as an update. Alternatively, or in addition to, the apparatus may include the widget runtime model for selecting a content reduction option for presenting the widget taken from a group consisting of scrolling at least a portion of content, omitting a graphic of the widget, and time sequencing a plurality of widgets.

In addition, the apparatus may further include the communication component for receiving a widget on one of the user devices from the remote widget portal that comprises an association with mobile user device usage; and the widget runtime model for selectively display the widget on the user interface depending upon a determination of whether the one user device is mobile.

Furthermore, the apparatus may also include the widget runtime model performing logging into the remote widget portal via one of the user devices to prompt a remote user account check to determine according to the user account data structure if a first time login, whether the widget has been previously installed on the one user device, and whether a user input widget configuration change has been received subsequent to pushing a widget configuration to the one user device.

For example, in another aspect, a method is provided for dynamically localizing content of an application graphical user interface widget executed on a widget runtime model of a computing platform on a user device. A platform independent graphical user interface widget configured to provide location-responsive content in a platform independent presentation runtime model by specifying a static geographic location. A configuration setting is received to configure the graphical user interface widget for a localized mode. A geographic location is retrieved for the user device. The geographic location is provided to the widget runtime model for the widget to select appropriate location-responsive content.

The method may further include synchronizing the location-responsive widget between a first user device and a second user device by communicating a widget identification and a widget localized configuration to a remote widget portal for storing in a user account data structure, and by receiving an update pushed from the remote widget platform to the second user device associated with the user account data structure in response to a determination that a second user device runtime model lacks a corresponding localized configured widget.

Further, the method may also include receiving the geographic location from a second user device. In addition, the method may include receiving the geographic location from the second user device via a remote widget portal in communication with both the first and second user devices. Alternatively, or in addition to, the method may include inferring that the geographic location of the first user device coincides with the geographic location of the second user device. Moreover, the method may also include using the geographic location of the second user device for the first user device to comply with a user preference.

Moreover, the method may further include receiving the configuration setting to configure the graphical user interface widget for the localized mode by determining that the user device is a mobile communication device. In addition, the method may further include altering a presentation of content by the location-responsive widget by determining that the user device is moving.

The method may also include selectively displaying the location-responsive widget based upon a usage mode inferred from received geographic location. In addition, the method may include determining a selected one of a group consisting of work mode and home mode based on geographic location.

Furthermore, the method may include receiving the geographic location from a second user device both logged into remote widget portal and associated with a common user.

Moreover, the method may include receiving the geographic location from a remote widget portal that cross references a geographic location of a network node connected to the user device.

The method may further include determining the geographic location by receiving a plurality of global positioning system signals.

In another aspect, at least one processor is provided for dynamically localizing content of an application graphical user interface widget executed on a widget runtime model of a computing platform on a user device. A first module configures a platform independent graphical user interface widget that provides location-responsive content in a platform independent presentation runtime model by specifying a static geographic location. A second module receives a configuration setting to configure the graphical user interface widget for a localized mode. A third module retrieves a geographic location for the user device. A fourth module provides the geographic location to the widget runtime model for the widget to select appropriate location-responsive content.

In an additional aspect, a computer program product is provided for dynamically localizing content of an application graphical user interface widget executed on a widget runtime model of a computing platform on a user device. A computer-readable medium comprises sets of instructions for causing a computer to configure a platform independent graphical user interface widget that provides location-responsive content in a platform independent presentation runtime model by specifying a static geographic location, to configure the graphical user interface widget for a localized mode, to retrieve a geographic location for the user device, and to provide the geographic location to the widget runtime model for the widget to select appropriate location-responsive content.

In a further aspect, an apparatus for dynamically localizing content of an application graphical user interface widget executed on a widget runtime model of a computing platform on a user device. The apparatus includes means for configuring a platform independent graphical user interface widget that provides location-responsive content in a platform independent presentation runtime model by specifying a static geographic location. The apparatus further includes means for receiving a configuration setting to configure the graphical user interface widget for a localized mode. Further included in the apparatus is means for retrieving a geographic location for the user device. Then, the apparatus includes means for providing the geographic location to the widget runtime model for the widget to select appropriate location-responsive content.

In another additional aspect, an apparatus is provided for dynamically localizing content of an application graphical user interface widget executed on a widget runtime model of a computing platform on a user device. A computing platform executes a platform independent presentation runtime model. A user interface configures a platform independent graphical user interface widget that provides location-responsive content in a platform independent presentation runtime model by specifying a static geographic location. A communication component receives a configuration setting to configure the graphical user interface widget for a localized mode, for retrieving a geographic location for the user device, and for providing the geographic location to the widget runtime model for the widget to select appropriate location-responsive content.

The apparatus may further include synchronizing the location-responsive widget between a first user device and a second user device by communicating a widget identification and a widget localized configuration to a remote widget portal for storing in a user account data structure, and by receiving an update pushed from the remote widget platform to the second user device associated with the user account data structure in response to a determination that a second user device runtime model lacks a corresponding localized configured widget.

The apparatus may further include receiving the geographic location from a second user device. In addition, the apparatus may further include receiving the geographic location from the second user device via a remote widget portal in communication with both the first and second user devices. Alternatively, or in addition to, the apparatus may include inferring that the geographic location of the first user device coincides with the geographic location of the second user device. Moreover, the apparatus may further include using the geographic location of the second user device for the first user device to comply with a user preference.

In addition, the apparatus may further include receiving the configuration setting to configure the graphical user interface widget for the localized mode by determining that the user device is a mobile communication device. Further, the apparatus may also include altering a presentation of content by the location-responsive widget by determining that the user device is moving.

Moreover, the apparatus may further include selectively displaying the location-responsive widget based upon a usage mode inferred from received geographic location. Further, the apparatus may include determining a selected one of a group consisting of work mode and home mode based on geographic location.

The apparatus may further include receiving the geographic location from a second user device both logged into remote widget portal and associated with a common user.

In addition, the apparatus may further include receiving the geographic location from a remote widget portal that cross references a geographic location of a network node connected to the user device.

Furthermore, the apparatus may include determining the geographic location by receiving a plurality of global positioning system signals.

In yet one other aspect, for example, a method is provided for dynamically localizing content of an application graphical user interface widget executed on a widget runtime model of a computing platform on a user device. A platform independent graphical user interface widget is defined that is configurable to provide location-responsive content. The widget is transmitted to a platform independent presentation runtime model of a user device defaulting to a static geographic location. The runtime model receives a configuration setting to configure the graphical user interface widget for a localized mode, retrieves a geographic location for the user device, and provides the geographic location to the widget to select appropriate location-responsive content.

The method may further include receiving a widget identification and a widget localized configuration from the first user device; storing the widget identification and the widget localized confirmation in a user account data structure; and pushing an update to a second user device associated with the user account data structure in response to a determination that a second user device runtime model lacks a corresponding localized configured widget.

Further, the method may include receiving the geographic location from a second user device. In addition, the method may further include receiving the geographic location from the second user device via a remote widget portal in communication with both the first and second user devices. Alternatively, or in addition to, the method may include inferring that the geographic location of the first user device coincides with the geographic location of the second user device. Moreover, the method may include using the geographic location of the second user device for the first user device to comply with a user preference.

The method may further include receiving the configuration setting to configure the graphical user interface widget for the localized mode by determining that the user device is a mobile communication device. In addition, the method may further include altering a presentation of content by the location-responsive widget by determining that the user device is moving.

Additionally, the method may further include selectively displaying the location-responsive widget based upon a usage mode inferred from received geographic location. Moreover, the method may additionally include determining a selected one of a group consisting of work mode and home mode based on geographic location.

The method may further include receiving the geographic location from a second user device both logged into remote widget portal and associated with a common user.

Further, the method may include determining the geographic location by cross referencing a geographic location of a network node connected to the user device.

Moreover, the method may include determining the geographic location by receiving a plurality of global positioning system signals.

In yet another aspect, at least one processor is provided for dynamically localizing content of an application graphical user interface widget executed on a widget runtime model of a computing platform on a user device. A first module defines a platform independent graphical user interface widget configurable to provide location-responsive content. A second module transmits the widget to a platform independent presentation runtime model of a user device defaulting to a static geographic location. The runtime model receives a configuration setting to configure the graphical user interface widget for a localized mode, retrieves a geographic location for the user device, and provides the geographic location to the widget to select appropriate location-responsive content.

In yet an additional aspect, a computer program product is provided for dynamically localizing content of an application graphical user interface widget executed on a widget runtime model of a computing platform on a user device. A computer-readable medium comprises sets of instructions for causing a computer to define a platform independent graphical user interface widget configurable to provide location-responsive content, and to transmit the widget to a platform independent presentation runtime model of a user device defaulting to a static geographic location. The runtime model receives a configuration setting to configure the graphical user interface widget for a localized mode, retrieves a geographic location for the user device, and provides the geographic location to the widget to select appropriate location-responsive content.

In yet a further aspect, an apparatus is provided for dynamically localizing content of an application graphical user interface widget executed on a widget runtime model of a computing platform on a user device. The apparatus includes means for defining a platform independent graphical user interface widget configurable to provide location-responsive content. The apparatus further includes means for transmitting the widget to a platform independent presentation runtime model of a user device defaulting to a static geographic location. The runtime model receives a configuration setting to configure the graphical user interface widget for a localized mode, retrieves a geographic location for the user device, and provides the geographic location to the widget to select appropriate location-responsive content.

In yet another additional aspect, an apparatus is provided for dynamically localizing content of an application graphical user interface widget executed on a widget runtime model of a computing platform on a user device. A widget portal defines a platform independent graphical user interface widget configurable to provide location-responsive content. A network communication component transmits the widget to a platform independent presentation runtime model of a user device defaulting to a static geographic location. The runtime model receives a configuration setting to configure the graphical user interface widget for a localized mode, retrieves a geographic location for the user device, and provides the geographic location to the widget to select appropriate location-responsive content.

The apparatus may further include the widget portal for receiving a widget identification and a widget localized configuration from the first user device, network storage for storing the widget identification and the widget localized confirmation in a user account data structure, and a synchronization component for pushing an update to a second user device associated with the user account data structure in response to a determination that a second user device runtime model lacks a corresponding localized configured widget.

Further, the apparatus may include the widget portal for receiving the geographic location from a second user device. In addition, the apparatus may further include receiving the widget portal for maintaining a user node in the network storage for tracking the geographic location from the second user device. Alternatively, or in addition, to the apparatus may further include the widget portal for inferring that the geographic location of the first user device coincides with the geographic location of the second user device. Moreover, the apparatus may further include the widget portal for using the geographic location of the second user device for the first user device to comply with a user preference.

The apparatus may further include the communication component for receiving the configuration setting to configure the graphical user interface widget for the localized mode by determining that the user device is a mobile communication device. In addition, the apparatus may further include the widget portal for altering a presentation of content by the location-responsive widget by determining that the user device is moving.

Moreover, the apparatus may further include the widget portal for selectively displaying the location-responsive widget based upon a usage mode inferred from received geographic location. Additionally, the apparatus may further include the widget portal for determining a selected one of a group consisting of work mode and home mode based on geographic location.

Further, the apparatus may include the widget portal for receiving the geographic location from a second user device both logged into remote widget portal and associated with a common user.

In addition, the apparatus may further include the widget portal for receiving the geographic location from a remote widget portal that cross references a geographic location of a network node connected to the user device.

The apparatus may also include determining the geographic location by receiving a plurality of global positioning system signals.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for dynamically localizing content of a platform independent graphical user interface widget executed on a widget runtime model of a computing platform on a user device, comprising:
   configuring the platform independent graphical user interface widget that provides location-responsive content in a platform independent presentation runtime model by defaulting to a static geographic location customized by a user of the user device;
   receiving a configuration setting to configure the platform independent graphical user interface widget for a localized mode;
   retrieving a geographic location for the user device;
   providing the retrieved geographic location to the widget runtime model for the platform independent graphical user interface widget to select appropriate location-responsive content; and
   switching the widget runtime model for the platform independent graphical user interface widget back to the static geographic location by flushing the retrieved geographic location from a cache of the user device.

2. An apparatus for dynamically localizing content of a platform independent graphical user interface widget executed on a widget runtime model of a computing platform on a user device, comprising:
   the computing platform;
   a platform independent presentation runtime model executed on the computing platform;
   a user interface configured to configure a platform independent graphical user interface widget that provides location-responsive content in the platform independent presentation runtime model by defaulting to a static geographic location customized by a user of the user device; and
   a communication component configured to receive a configuration setting to configure the platform independent graphical user interface widget for a localized mode, to retrieve a geographic location for the user device, and to provide the retrieved geographic location to the widget runtime model for the platform independent graphical user interface widget to select appropriate location-responsive content,
   wherein the computing platform is configured to switch the widget runtime model for the platform independent graphical user interface widget back to the static geographic location by flushing the retrieved geographic location from a cache of the user device.

3. A method for dynamically localizing content of a platform independent graphical user interface widget executed on a widget runtime model of a computing platform on a user device, comprising:
   defining a platform independent graphical user interface widget configurable to provide location-responsive content; and
   transmitting the platform independent graphical user interface widget to a platform independent presentation runtime model of the user device defaulting to a static geographic location customized by a user of the user device;
   wherein the platform independent presentation runtime model receives a configuration setting to configure the platform independent graphical user interface widget for a localized mode, retrieves a geographic location for the user device, and provides the retrieved geographic location to the platform independent graphical user interface widget to select appropriate location-responsive content,
   wherein the widget runtime model for the platform independent graphical user interface widget is configured to switch back to the static geographic location based on the retrieved geographic location being flushed from a cache of the user device.

4. An apparatus for dynamically localizing content of a platform independent graphical user interface widget executed on a widget runtime model of a computing platform on a user device, comprising:
   a widget portal configured to define a platform independent graphical user interface widget configurable to provide location-responsive content; and
   a network communication component configured to transmit the platform independent graphical user interface widget to a platform independent presentation runtime model of the user device defaulting to a static geographic location customized by a user of the user device;
   wherein the platform independent presentation runtime model receives a configuration setting to configure the platform independent graphical user interface widget for a localized mode, retrieves a geographic location for the user device, and provides the retrieved geographic location to the platform independent graphical user interface widget to select appropriate location-responsive content,
   wherein the widget runtime model for the platform independent graphical user interface widget is configured to switch back to the static geographic location based on the retrieved geographic location being flushed from a cache of the user device.

* * * * *